US011999071B2

(12) United States Patent
Musallam et al.

(10) Patent No.: US 11,999,071 B2
(45) Date of Patent: Jun. 4, 2024

(54) ELECTRIC HANDHELD HAIR TRIMMER INCLUDING TRANSVERSE EDGE PORTIONS

(71) Applicant: Spectrum Brands, Inc., Middleton, WI (US)

(72) Inventors: Timin Ahmad Musallam, Middleton, WI (US); Long Quan, Guang Zhou (CN); Tung Yan Lau, Hong Kong (CN); Ken Wong, Hong Kong (CN)

(73) Assignee: SPECTRUM BRANDS, INC., Middleton, WI (US)

(*) Notice: Subject to any disclaimer, the term of this patent is extended or adjusted under 35 U.S.C. 154(b) by 0 days.

(21) Appl. No.: 18/096,506

(22) Filed: Jan. 12, 2023

(65) Prior Publication Data

US 2023/0166413 A1 Jun. 1, 2023

Related U.S. Application Data

(63) Continuation of application No. 17/461,643, filed on Aug. 30, 2021, now Pat. No. 11,577,413, which is a
(Continued)

(51) Int. Cl.

| | |
|---|---|
| ***B26B 19/04*** | (2006.01) |
| ***B26B 19/06*** | (2006.01) |
| ***B26B 19/38*** | (2006.01) |

(52) U.S. Cl.
CPC ............ *B26B 19/046* (2013.01); *B26B 19/06* (2013.01); *B26B 19/3846* (2013.01)

(58) Field of Classification Search
CPC ....... B26B 19/046; B26B 19/02; B26B 19/06; B26B 19/12; B26B 19/3846; B26B 19/46;
(Continued)

(56) References Cited

U.S. PATENT DOCUMENTS 2,152,815 A * 4/1939 Muros ..................... B26B 19/06 30/225
2,223,205 A * 11/1940 Dalkowitz ............ B26B 19/042 30/346.51

(Continued)

FOREIGN PATENT DOCUMENTS

CN 20465873 U * 9/2015 ............. B26B 19/20
WO WO 2009052952 * 4/2009 ......... B26B 19/3846

*Primary Examiner* — Ghassem Alie
(74) *Attorney, Agent, or Firm* — Armstrong Teasdale LLP

(57) ABSTRACT

A trimmer includes a blade assembly including a stationary blade and a movable blade. Each of the stationary blade and the movable blade includes blade teeth. The stationary blade includes a first transverse edge portion, a second transverse edge portion, and a middle portion. The first transverse edge portion includes a first upper surface extending from a first edge to the upper surface. The second transverse edge portion includes a second upper surface extending from a second edge to the upper surface. The first transverse edge portion and the second transverse edge portion are beveled from the middle portion to the respective edges of the stationary blade. The stationary blade is symmetric about a midline of the middle portion. In some embodiments, the trimmer includes a toothed blade guard.

20 Claims, 23 Drawing Sheets

Related U.S. Application Data continuation of application No. 16/489,253, filed as application No. PCT/US2018/019891 on Feb. 27, 2018, now Pat. No. 11,104,016.

(60) Provisional application No. 62/463,918, filed on Feb. 27, 2017.

(58) Field of Classification Search
CPC . B26B 19/384; B26B 19/3893; B26B 19/063; B26B 19/20; B26B 21/40; B26B 19/042
USPC ...... 30/32, 43.92, 34.1, 45, 34.05, 210, 216, 30/223, 233.5, 43.91, 42, 44, 208, 209, 30/43.9, 225, 233; 76/104.1
See application file for complete search history.

(56) References Cited

U.S. PATENT DOCUMENTS

| | | | | |
|---|---|---|---|---|
| 2,395,495 | A * | 2/1946 | Murphy | B26B 19/06 30/34.2 |
| 2014/0317932 | A1 * | 10/2014 | Van Straaten | B26B 19/38 30/223 |
| 2016/0236362 | A1 * | 8/2016 | Stapelbroek | B26B 19/3846 |

* cited by examiner

ELECTRIC HANDHELD HAIR TRIMMER INCLUDING TRANSVERSE EDGE PORTIONS

CROSS-REFERENCE TO RELATED APPLICATIONS

This application is a continuation of U.S. patent application Ser. No. 17/461,643 filed on Aug. 30, 2021, which is a continuation of U.S. patent application Ser. No. 16/489,253 filed on Aug. 27, 2019, which is a National Stage application of International Application No. PCT/US2018/019891 filed on Feb. 27, 2018, which claims priority to U.S. Provisional Application No. 62/463,918 filed on Feb. 27, 2017, the entire contents and disclosures of which are incorporated herein by reference in their entirety.

FIELD OF THE DISCLOSURE

The present invention relates generally to hair grooming appliances, and more particularly to electric handheld hair trimmers including a beveled blade.

BACKGROUND OF THE DISCLOSURE

Conventional handheld hair trimmers typically include a head including a stationary blade and a movable blade. A motor is operable to reciprocate the movable blade relative to the stationary blade to cut hairs. In at least some known handheld trimmers, the stationary blade and the movable blade include blade teeth that are relatively planar and extend to end points to define the blade edges of the stationary and movable blades. To obtain a suitable sharpness of these teeth, the thickness of the blades must be relatively thin. Following repeated use of the trimmer, the tips of the blade teeth may deteriorate and possibly break.

Additionally, during operation of typical trimmers, the blades are moved along a user's skin and the blades cut hairs extending between the teeth. However, the blades may irritate and even cut the user's skin. Accordingly, some handheld trimmers include guards that extend next to the blades to slightly space the edges of the blades from the user's skin during trimming. However, these guards can prevent or otherwise inhibit the blades from properly cutting hairs. In addition, a user's skin may be pinched in the spacing between the guard and the blade edges.

There is a need, therefore, for a hair grooming appliance that provides for a suitably sharp blade edge while providing desired durability, and further includes a guard that reduces the risk of pinching and allows for a trimming hair of a wider range of hair lengths.

BRIEF DESCRIPTION

In one aspect, a hair grooming appliance includes, a handle, a drive assembly in the handle, and a head attached to the handle. The head includes a stationary blade including a first transverse edge portion having a first upper surface and blade teeth, a second transverse edge portion having a second upper surface and blade teeth, and a middle portion connecting the first transverse edge portion and the second transverse edge portion. The blade teeth of the first transverse edge portion define a first edge of the stationary blade. The blade teeth of the second transverse edge portion define a second edge of the stationary blade. The first upper surface extends from the first edge of the stationary blade to the middle portion. The second upper surface extends from the second edge of the stationary blade to the middle portion. The first transverse edge portion and the second transverse edge portion are beveled from the middle portion to the respective edges of the stationary blade. The stationary blade is symmetric about a midline of the middle portion. The head also includes a movable blade in shearing contact with the first transverse edge portion and the second transverse edge portion of the stationary blade. The drive assembly is operable to reciprocate the movable blade relative to the stationary blade.

In another aspect, a blade assembly for an electric handheld hair trimmer includes a stationary blade including a first transverse edge portion including a first upper surface and blade teeth. The blade teeth define a first edge of the stationary blade. The stationary blade also includes a second transverse edge portion including a second upper surface and blade teeth. The blade teeth define a second edge of the stationary blade. The stationary blade further includes a middle portion connecting the first transverse edge portion and the second transverse edge portion. The first upper surface extends from the first edge to the middle portion. The second upper surface extends from the second edge to the middle portion. The first transverse edge portion and the second transverse edge portion are beveled from the middle portion to the respective edges of the stationary blade. The stationary blade is symmetric about a midline of the middle portion. The blade assembly also includes a movable blade in shearing contact with the first transverse edge portion and the second transverse edge portion of the stationary blade. The blade assembly further includes a mounting component connected to the middle portion of the stationary blade. The mounting component extends through the movable blade.

In yet another aspect, a head for an electric handheld trimmer includes a stationary blade, a movable blade, and a guard. The stationary blade includes a first transverse edge portion including a first upper surface and blade teeth, a second transverse edge portion including a second upper surface and blade teeth, and a middle portion connecting the first transverse edge portion and the second transverse edge portion. The blade teeth of the first transverse edge portion define a first edge of the stationary blade. The blade teeth of the second transverse edge portion define a second edge of the stationary blade. The first upper surface extends from the first edge to the middle portion. The second upper surface extends from the second edge to the middle portion. The first upper surface includes at least one of an angled surface, a concave surface, and a convex surface along at least a portion of the extension of the first upper surface between the middle portion and the first blade edge. The movable blade includes a first edge and an opposing second edge. The first and second edges include blade teeth in shearing contact with the respective blade teeth of the stationary blade. The guard is disposed outward of and extends in proximity to the respective blade teeth of the stationary blade and movable blade. The guard defines an interior space configured to receive the stationary blade and the movable blade The guard includes a middle portion and comb portions extending from the middle portion along the first and second edges of the stationary blade.

DRAWINGS

These and other features, aspects, and advantages of the present disclosure will become better understood when the following detailed description is read with reference to the accompanying drawings in which like characters represent like parts throughout the drawings, wherein.

Corresponding reference characters indicate corresponding parts throughout the drawings.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a," "an," and "the" include plural references unless the context clearly dictates otherwise. The terms "comprising," "including," and "having" are intended to be inclusive and mean that there may be additional elements other than the listed elements. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
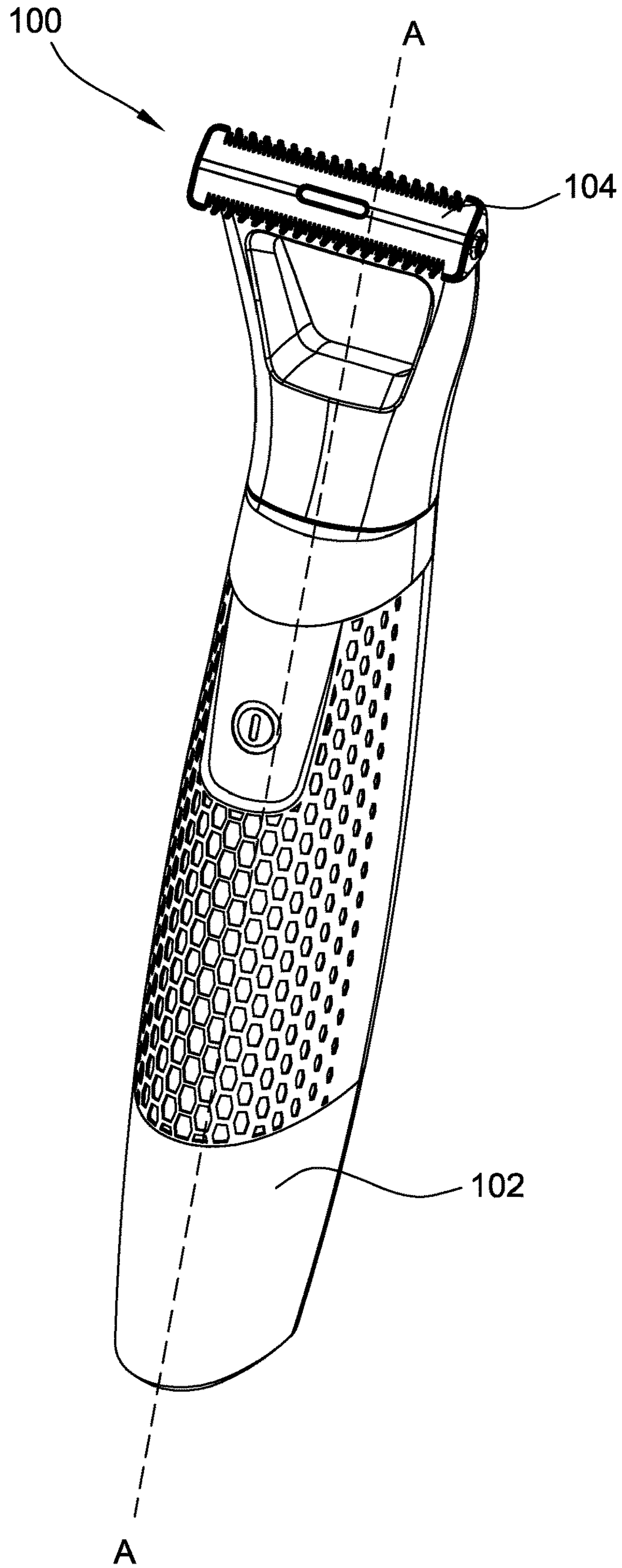
FIG. 1 is a perspective view of a first embodiment of a hair grooming appliance.
Figure 2:
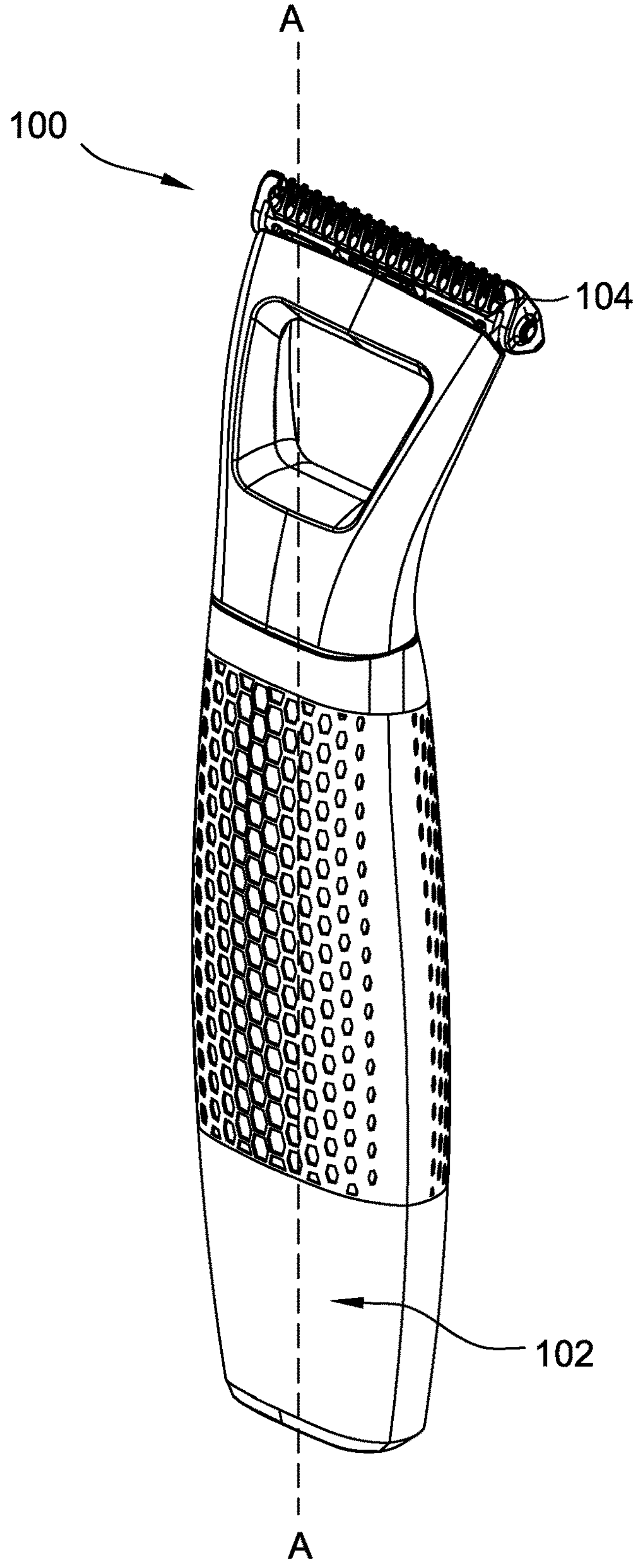
FIG. 2 is a rear perspective view of the hair grooming appliance shown in FIG. 1.
Figure 3:
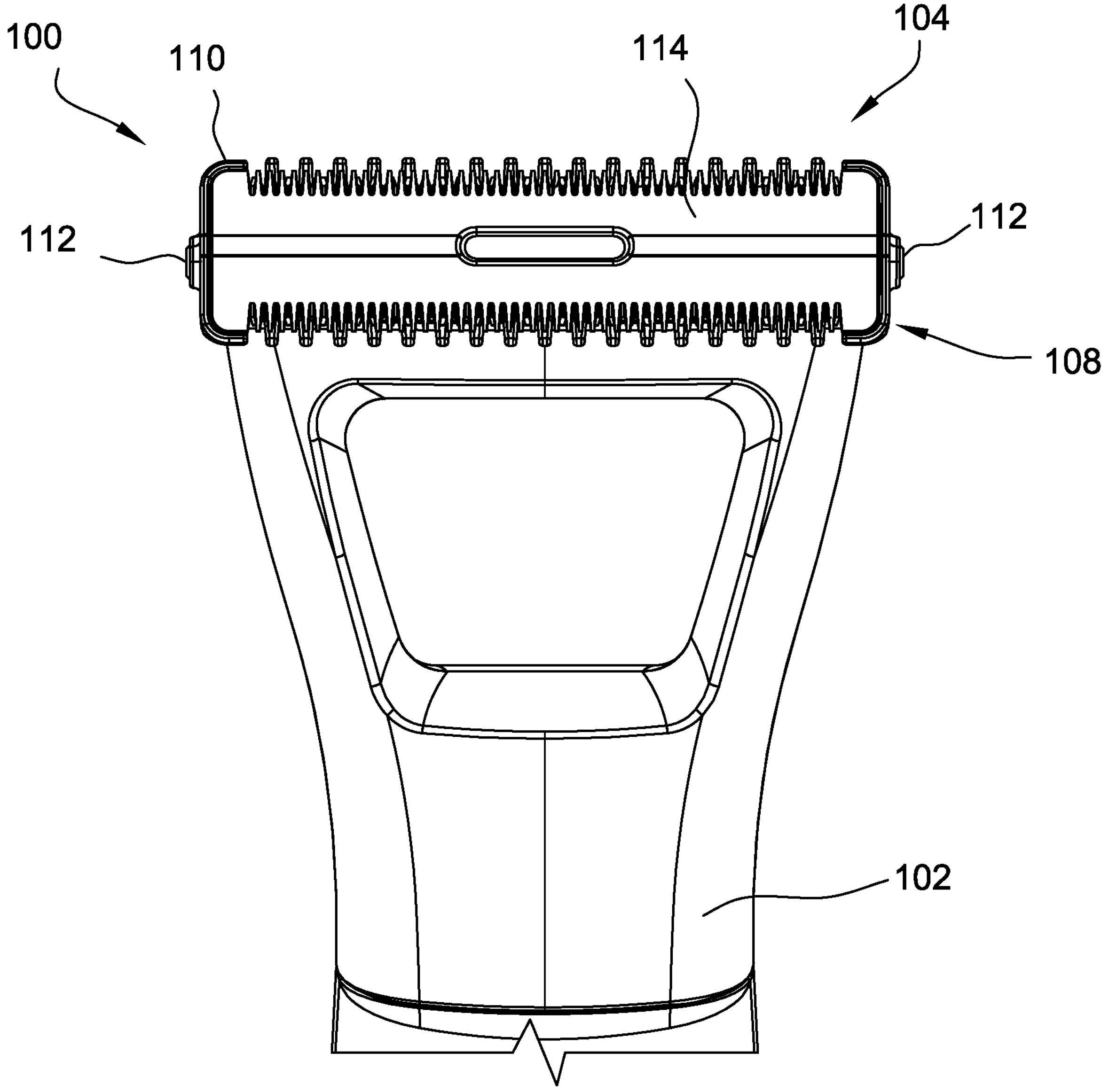
FIG. 3 is an enlarged front elevation of a portion of the hair grooming appliance shown in FIGS. 1 and 2.
Figure 4:
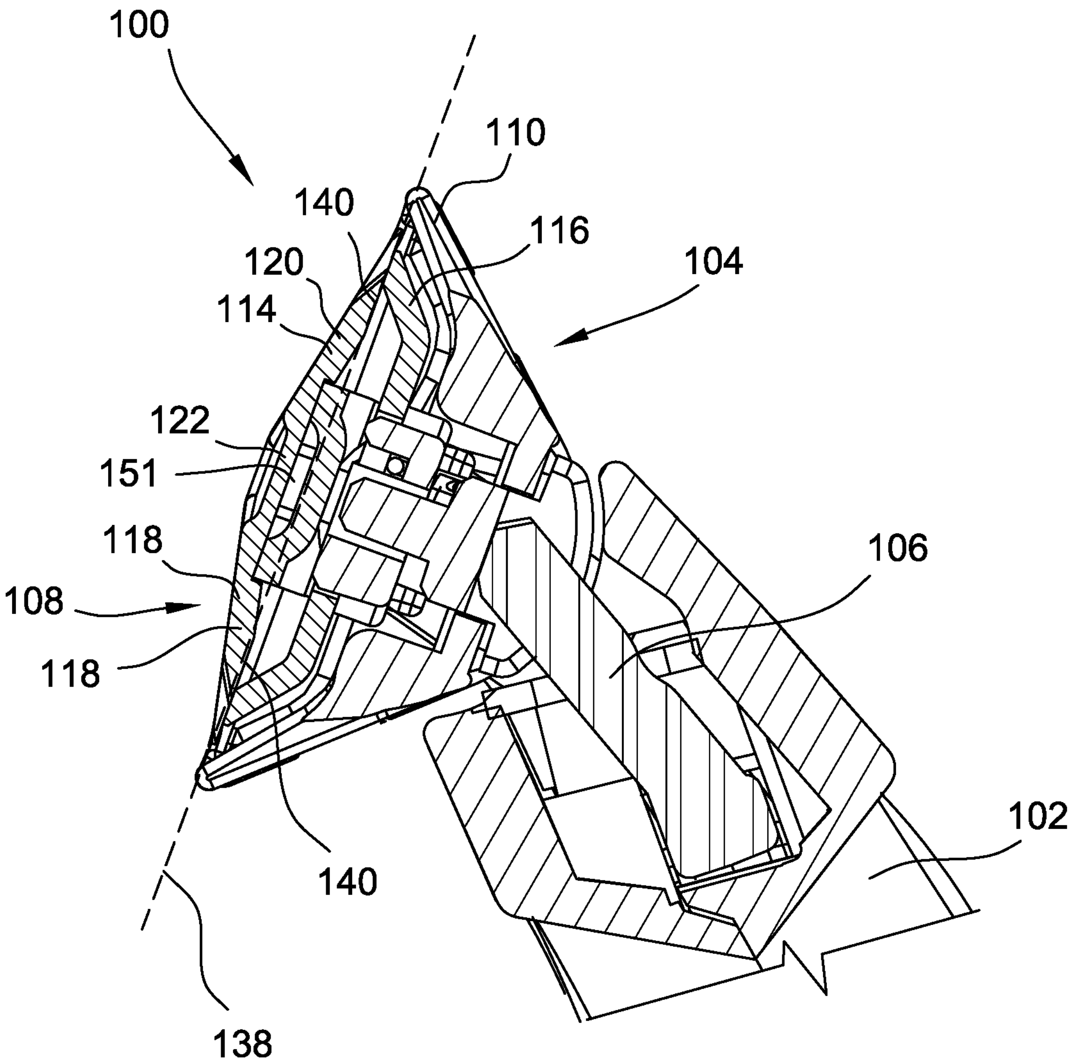
FIG. 4 is a cross-section of a portion of the hair grooming appliance shown in FIGS. 1 and 2.
Figure 5:
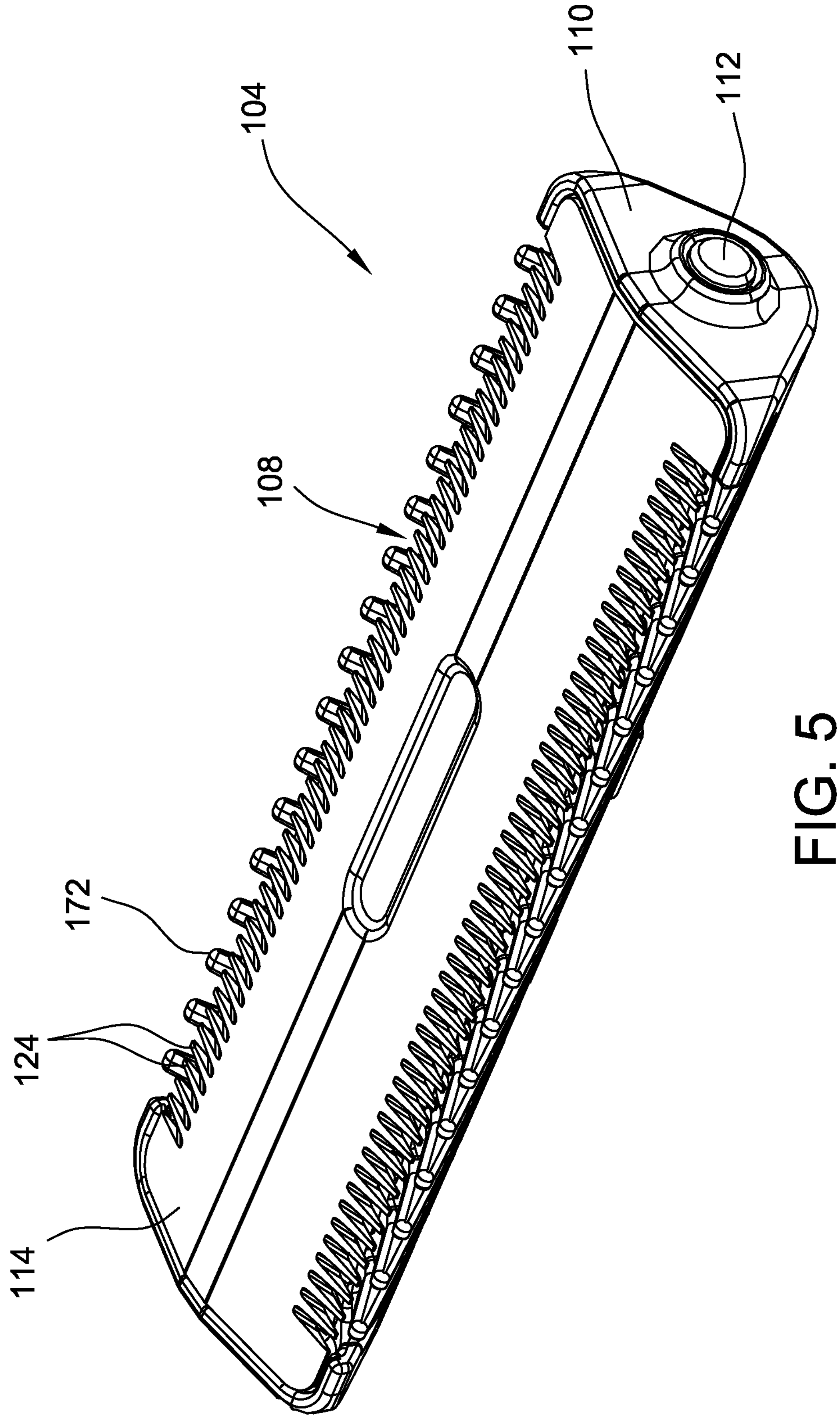
FIG. 5 is a perspective view of a head of the hair grooming appliance shown in FIGS. 1 and 2.
Figure 6:
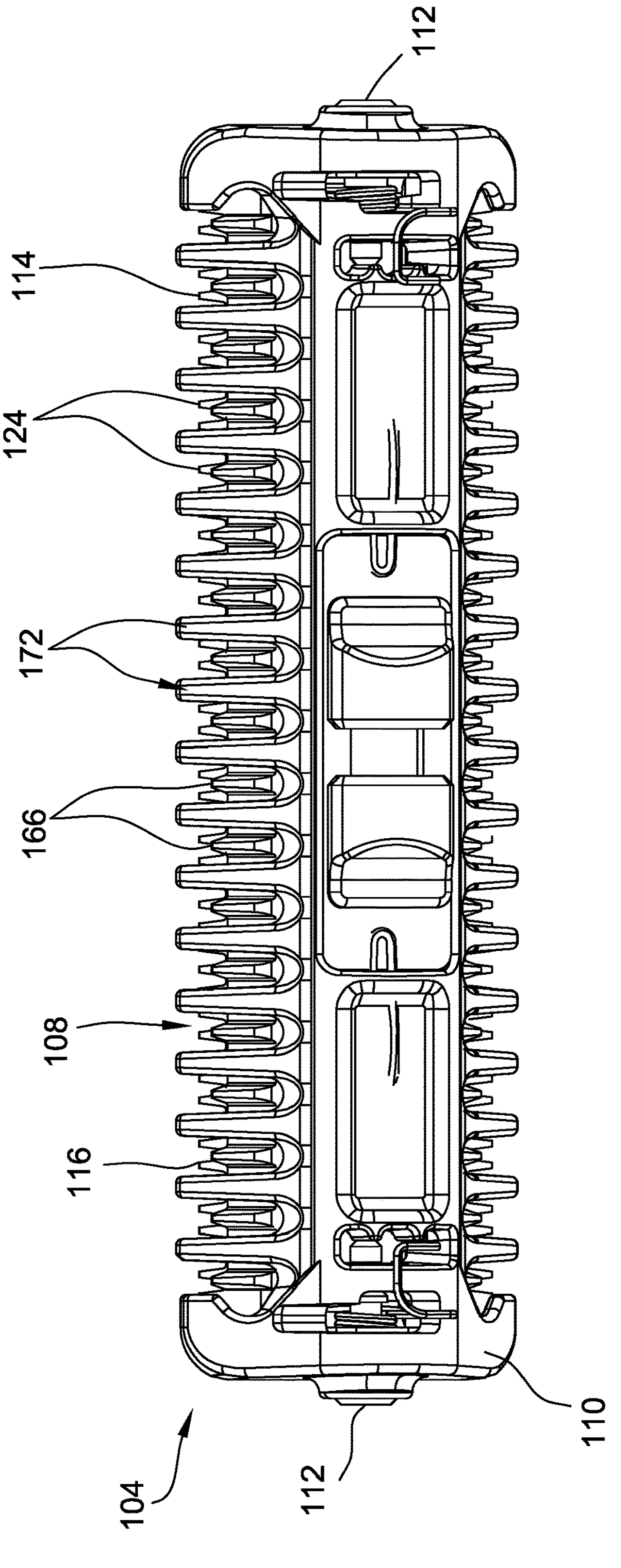
FIG. 6 is a bottom view of a blade assembly of the head shown in FIG. 5.

Referring now to the drawings and in particular to FIGS. 1 and 2, a handheld hair grooming appliance according to one embodiment is illustrated in the form of an electric handheld hair trimmer, indicated generally by 100. It is contemplated, however, that the embodiments described herein may be used on other handheld hair grooming appliances such as, for example, electric shavers and hair clippers. The trimmer 100 includes a handle, indicated generally at 102, and a head (broadly a hair-grooming assembly), indicated generally at 104, mounted on and supported by the handle. Together, the handle 102 and the head 104 generally define a longitudinal axis A-A of the trimmer 100. A suitable motor (not shown) is disposed in the handle 102 along with a drive assembly 106 (shown in FIG. 4). The drive motor may be powered by one or more batteries (not shown) disposed within the handle 102 and/or by another suitable internal or external electrical power source. In the illustrated embodiment, the head 104 is detachable from the handle 102. Accordingly, the head 104 may be removed and another head 104 may be positioned on the handle 102. However, in other embodiments the head 104 may be affixed to handle 102 without departing from the scope of the invention.

Referring to FIGS. 3-6, the head 104 includes a blade assembly 108 operatively connected to the motor by the drive assembly 106, a blade guard 110, and mounting pins 112. Mounting arms project outward from the handle with the head 104 extending laterally between the arms. The mounting pins 112 extend through the respective mounting arm and the blade guard 110 to pivotally mount the head 104 on the handle 102. Accordingly, the head 104 is pivotable about a pivot axis extending through the mounting pins 112. In other embodiments, the position of the head 104 may be fixed (i.e., non-pivotable) relative to the handle 102. In some embodiments, the head 104 may be switched between a pivotable configuration and a non-pivotable configuration. In further embodiments, the head 104 may be pivotable about more than one pivot axis.

The blade assembly 108 generally comprises a stationary blade 114 and a movable blade 116. The drive assembly 106 is operable to laterally reciprocate the movable blade 116 relative to the stationary blade 114 to trim hair. It is understood that the trimmer head 104 may be of other configurations without departing from some aspects of the present invention.

Figure 7:
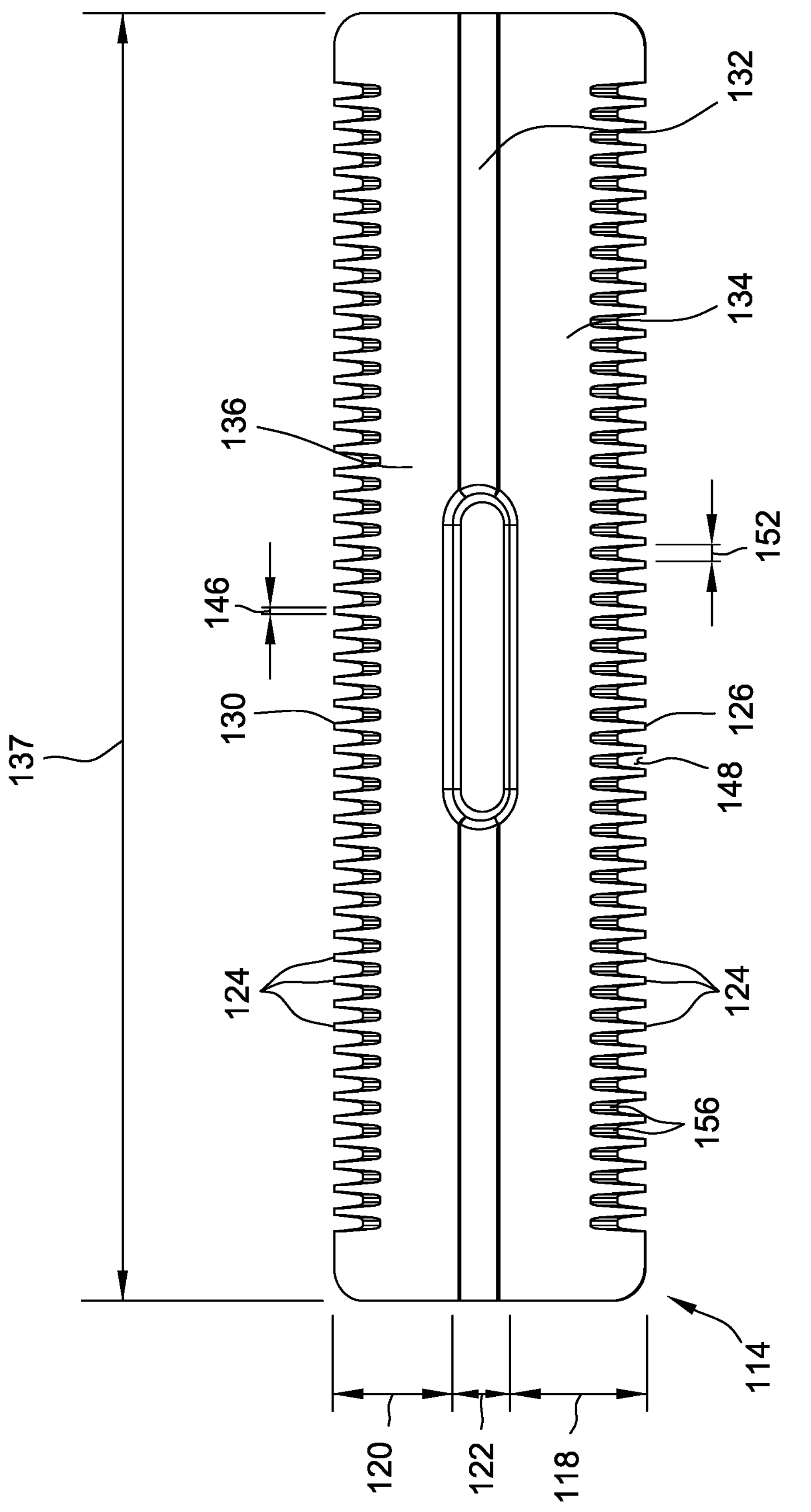
FIG. 7 is a top plan view of a stationary blade of the blade assembly shown in FIG. 6.
Figure 8:
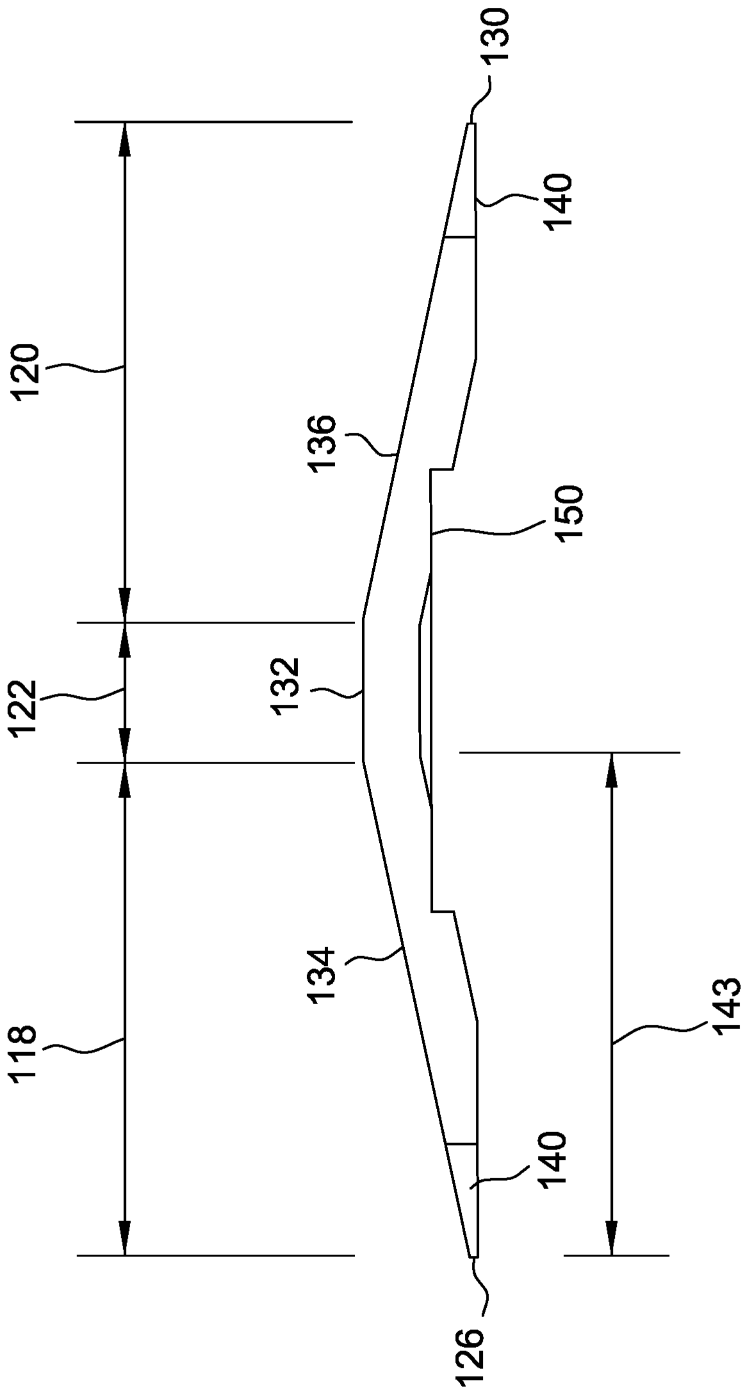
FIG. 8 is a side elevation of the stationary blade shown in FIG. 7.

With reference to FIGS. 7 and 8, the stationary blade 114 is suitably a dual-edge blade assembly including a first transverse edge portion 118, a second transverse edge portion 120, and a middle portion 122. The first transverse edge portion 118 includes a set of blade teeth 124 defining a first edge 126 of the blade 114. The second transverse edge portion 120 includes an opposite set of blade teeth 124 defining a second edge 130 of the blade 114. In other embodiments, the blade assembly 108 may be a single-edge blade assembly or any other suitable blade assembly that enables the trimmer 100 to operate as described herein.

The illustrated first edge 126 and second edge 130 are straight. In other embodiments, the first edge 126 and/or the second edge 130 may be at least partially curved or angled.

In the illustrated embodiment, the middle portion 122 is disposed intermediate and spans between the first transverse edge portion 118 and the second transverse edge portion 120 and includes a planar upper surface 132. In other embodiments, the middle portion 122 may include, without limitation, an apex, a curved surface, an angled surface, and any other suitable portion. For example, in some embodiments, the middle portion 122 may include an apex connecting the first transverse edge portion 118 and the second transverse edge portion 120.

The first transverse edge portion 118 includes a first upper surface 134 extending from the first edge 126 to the upper surface 132 of the middle portion 122. The second transverse edge portion 120 includes a second upper surface 136 extending from the second edge 130 to the upper surface 132 of the middle portion 122. The first upper surface 134 and the second upper surface 136 may include at least one of an angled surface, a concave curve, and a convex curve extending along at least a portion of the respective upper surface 134, 136 between the middle portion 122 and the respective edge 126, 130. In the illustrated embodiment, the first upper surface 134 and the second upper surface 136 are angled. The dual angles thus form the appearance of dual beveled edges on opposite sides of the middle portion 122. As used herein, the terms "bevel" and "beveled" refer to a surface that is oblique to an adjacent surface.

This beveling of the stationary blade 114 is believed to provide a sharper and more durable blade than conventional blades that are general flat or planar because the stationary blade 114 is beveled from the upper surface 132 to the respective edges 126, 130. For example, the bevels of the illustrated stationary blade 114 allow the first transverse edge portion 118 and the second transverse edge portion 120 to come to a relatively sharp point in which the blade is thinner, i.e. sharper, at the first and second edges 126, 130 than for conventional blades. In addition, the bevels allow the thickness of the stationary blade 114 to change at a constant rate as the blade extends from the middle portion 122 to the respective edges 126, 130. Also, the angle of the beveling allows the blade 114 to have an increased thickness in the middle portion 122, which reduces warpage of the blade 114. In contrast, at least some known blades include multiple surfaces with different slopes. In such known blades, there may be high stress areas in portions of the blade where the slope changes. Such conventional blades may also include sections which are thin and plate-shaped. As a result, such blades may deteriorate and even break after repeated use. In contrast, the stationary blade 114 of the illustrated embodiments has a sharper point and increased durability as a result of the bevels.

The illustrated stationary blade 114 has a transversely extending length 137 (FIG. 7). In some embodiments, this length 137 is in the range of about 5 mm to about 50 mm depending on the intended use of the trimmer 100, and more preferably in the range of about 10 mm to about 40 mm. In the illustrated embodiment, the length 137 is approximately 39 mm. In other embodiments, the stationary blade 114 may be of another suitable length and remain within the scope of the invention.

Figure 9:
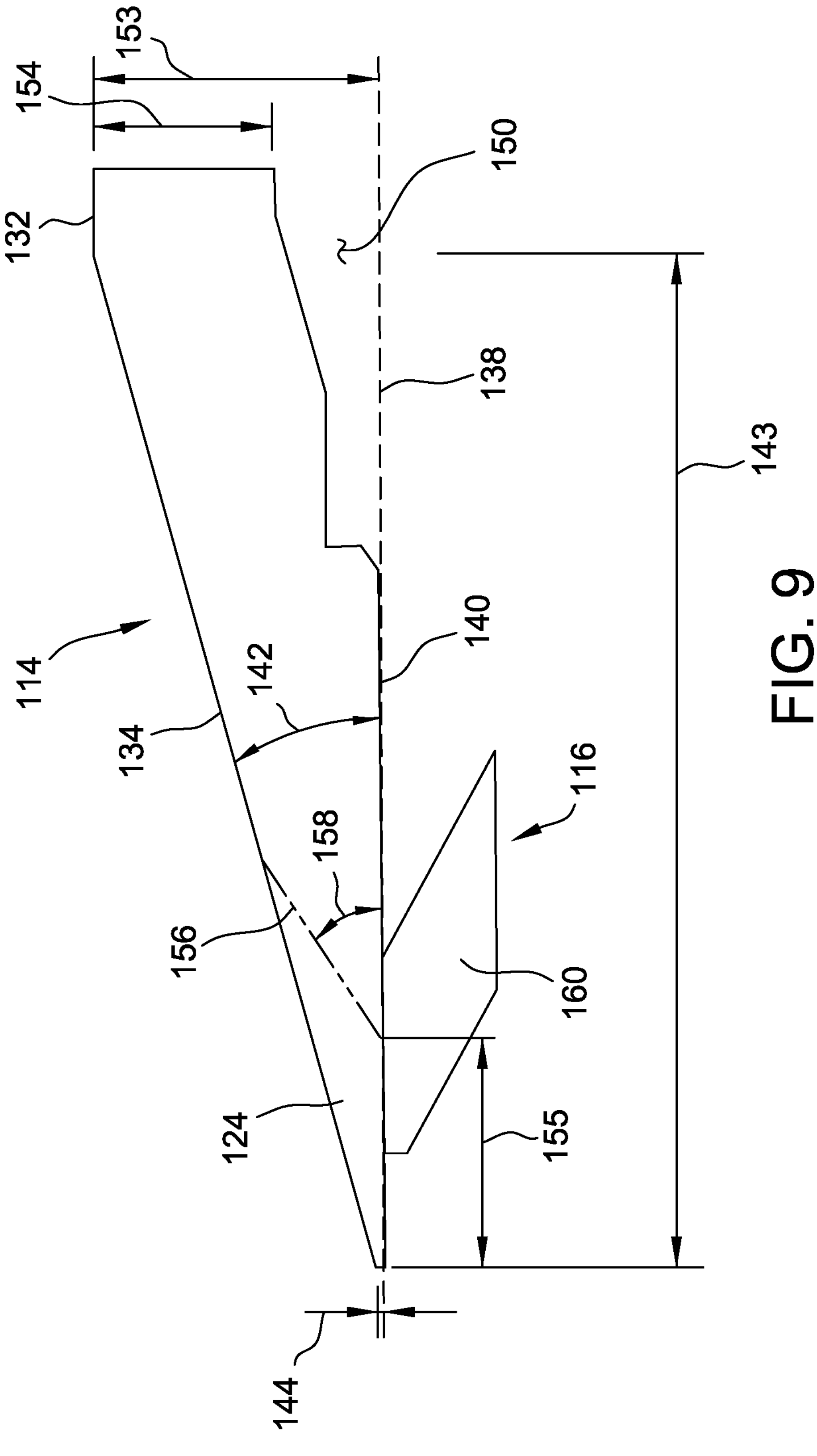
FIG. 9 is a schematic cross-section of a portion of the blade assembly shown in FIG. 6.

Referring now to FIG. 9, the stationary blade 114 and the movable blade 116 are in shearing contact with each other to define a cutting plane 138 therebetween. Specifically, the movable blade 116 is configured to contact lower surfaces 140 of the respective first and second transverse edge portions 118, 120 (shown in FIG. 8) along the cutting plane 138 as the movable blade reciprocates. The upper surface 132 of the middle portion 122 is substantially parallel to the cutting plane 138. The first upper surface 134 and the second upper surface 136 (shown in FIG. 8) are angled relative to the cutting plane 138.

In the illustrated embodiment, the stationary blade 114 is symmetric about a midline of the middle portion 122. Accordingly, the second transverse edge portion 120 has dimensions that are substantially equal to the first transverse edge portion 118. Therefore, the description herein, including dimensions, of the first transverse edge portion 118 may also apply to the second transverse edge portion 120, and vice versa. In other embodiments, the second transverse edge portion 120 and the first transverse edge portion 118 may differ and remain within the scope of the invention.

As shown in FIG. 9, the first upper surface 134 extends continuously at a constant slope from the upper surface 132 of the middle portion 122 to the first edge 126. The first upper surface 134 thus defines an angle 142 with the cutting plane 138. In some embodiments, this angle 142 is suitably in the range of about 5° to about 25°, and more preferably in the range of about 10° to about 20°. In the illustrated embodiment, the angle 142 is approximately 15°.

The first transverse edge portion 118 also has a width 143 (FIG. 8) extending from the first edge 126 to the middle portion 122. In suitable embodiments, this width 143 is in the range of about 0.5 mm to about 10 mm, more preferably in the range of about 2 mm to about 6 mm, and even more preferably in the range of about 4 mm to about 5 mm. In the illustrated embodiment, the width 143 of the first transverse edge portion 118 is approximately 4.5 mm.

The first transverse edge portion 118 further has a generally planar lower surface 140 opposite the first upper surface 134. The lower surface 140 is generally parallel to the upper surface 132 of the middle portion 122 and the cutting plane 138. The first upper surface 134 extends relative to the lower surface 140 at a constant angle from the first edge 126 to the middle portion 122. Accordingly, with reference to FIG. 9, the first transverse edge portion 118 has a varying thickness 144 between the first upper surface 134 and the lower surface 140. The first transverse edge portion 118 has a minimum thickness 144 at the first edge 126. In some embodiments, the thickness 144 at the first edge 126 is in the range of about 0.02 millimeters (mm) to about 0.07 mm. In the illustrated embodiment, the thickness 144 at the first edge 126 is approximately 0.06 mm.

With reference back to FIG. 7, each of the first and second transverse edge portions 118, 120 includes a respective set of teeth 124 at least partially forming the corresponding first and second edges 126, 130. Each tooth 124 has a width 146 at the respective edge 126, 130. In some embodiments, this width 146 is in the range of about 0.2 mm to about 1 mm, and more preferably in the range of about 0.3 mm to about 0.6 mm. In the illustrated embodiment, the width 146 is approximately 0.5 mm. The teeth 124 are spaced equidistant from each other by respective gaps 148 therebetween. The gaps 148 each have a width 152 at the respective edge 126, 130. In some embodiments, the width 152 of each gap is in the range of about 0.1 mm to about 0.5 mm. In the illustrated embodiment, the width 152 is approximately 0.3 mm.

With reference to FIG. 9, in one suitable embodiment the stationary blade 114 may be formed starting from a sheet material and removing material to form the gaps 148, thus also defining the teeth 124. For example, a tool (not shown) may be used to remove the material between the teeth 124 according to a predetermined tool depth 155. In some embodiments, the tool depth 155 is in the range of about 0.5 mm to about 2 mm. In the illustrated embodiment, the tool depth 155 is approximately 1 mm. At the tool depth 155, groove surfaces 156 are formed between the teeth 124. These groove surfaces 156 incline at an angle 158 (FIG. 9) relative to the cutting plane 138 from the lower surface 140 to the respective angled upper surface 134, 136. In some embodiments, the angle 158 of each groove surface 156 is in the range of 15° to about 45°. In the illustrated embodiment, the angle 158 is approximately 30°. It is understood that in other embodiments the teeth 123 of the stationary blade 114 may be formed in another suitable manner and/or to have other suitable configurations without departing from the scope of this invention.

As seen best in FIG. 8, the stationary blade 114 is configured to further have a cavity 150 in the lower surface opposite the upper surface 132 of the middle portion 122 of the blade. The cavity 150 spans the middle portion and further extends into the first and second transverse edge portions 118, 120. The cavity 150 is configured to receive mounting components for connecting the stationary blade 114 to the head 104. For example, in the illustrated embodiment, a post 151 extends through the movable blade 116 and is connected to the middle portion 122 of the stationary blade 114. The post 151 may be connected to the stationary blade 114 in any suitable manner. For example, the post 151 may be welded to the stationary blade 114. In the illustrated embodiment, the post 151 is integrally formed with the guard 110 and retains the blade assembly 108 within the guard. In other embodiments, the components of the head 104 may be connected to each other in any manner that enables the trimmer 100 to operate as described.

With reference to FIG. 9, the stationary blade 114 may have a reduced thickness along the cavity 150. For example, in the illustrated embodiment, a thickness 154 of the middle portion 122 above the cavity 150 is less than the distance 153 between the upper surface 132 and the cutting plane 138. The depth of the cavity 150 is the difference between the distance 153 and the thickness 154. In some embodiments, the distance 153 is in the range of about 0.5 mm to about 2 mm, more preferably in the range of about 1 mm to about 1.5 mm. In some embodiments, the thickness 154 is in the range of about 0.25 mm to about 1.25 mm, more preferably in the range of about 0.5 mm to about 1 mm. In other embodiments, the stationary blade 114 may have any suitable thickness. In alternative embodiments, the cavity 150 may be omitted.

Figure 10:
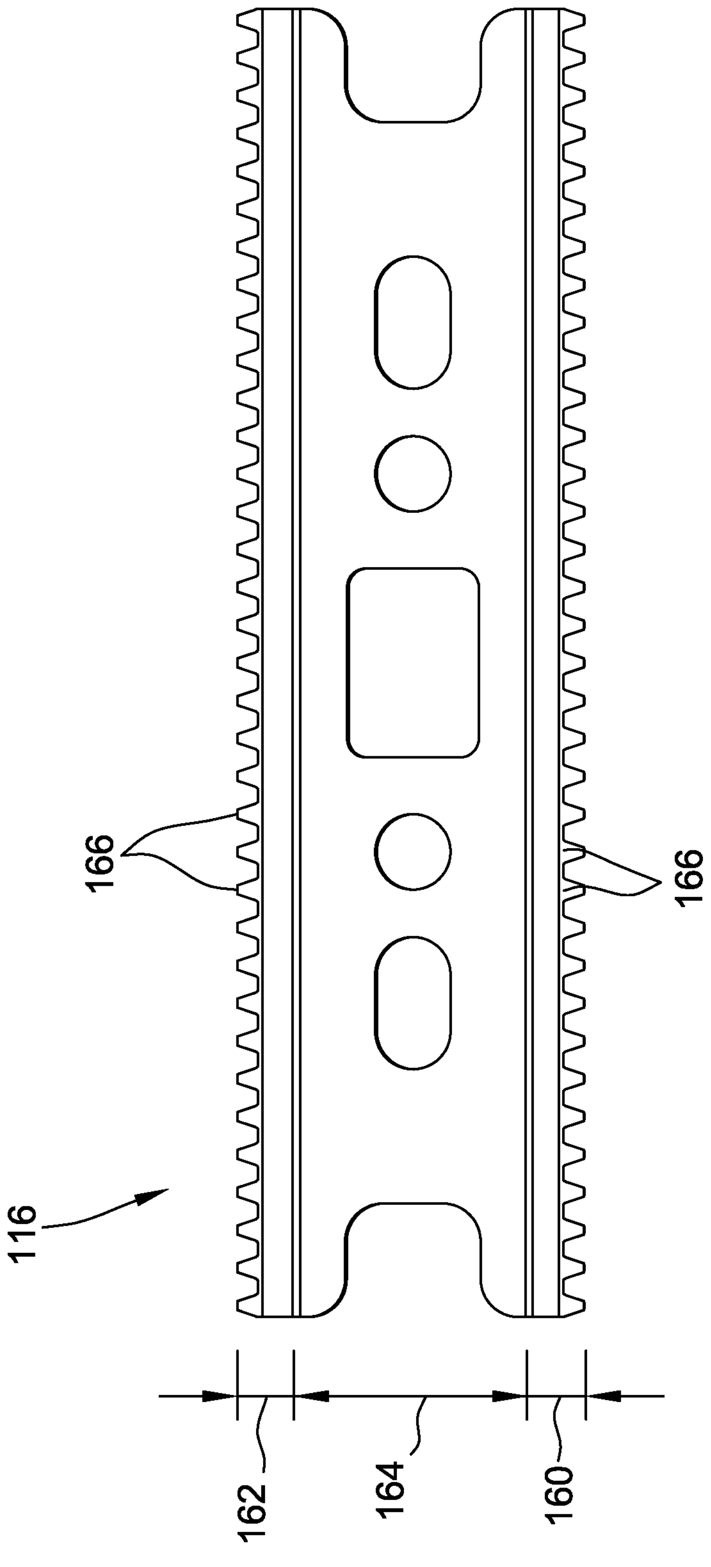
FIG. 10 is a top plan view of a movable blade of the blade assembly shown in FIG. 6.
Figure 11:
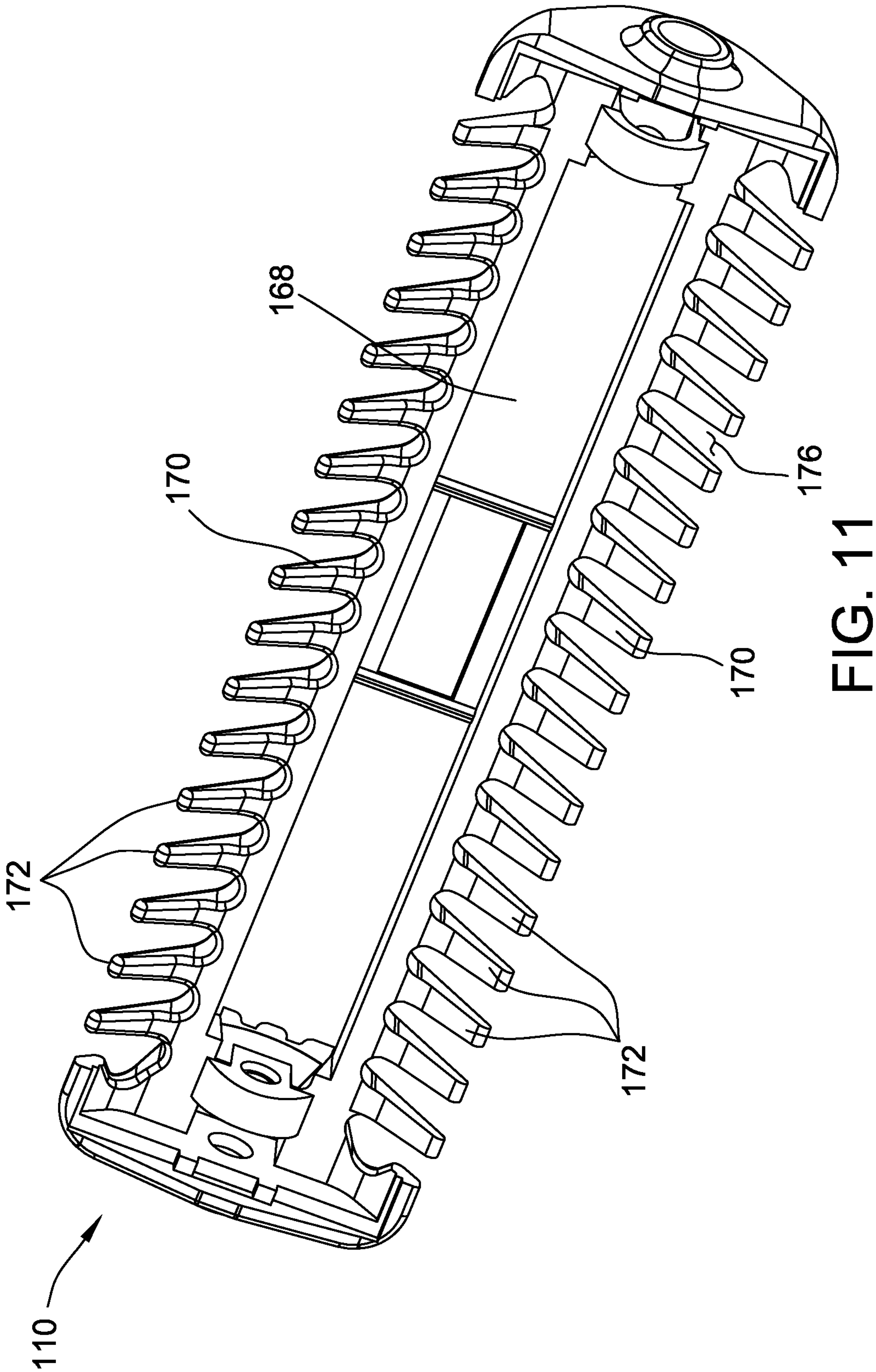
FIG. 11 is a perspective view of a guard of the head shown in FIG. 5.

Referring now to FIG. 10, the movable blade 116 includes a first transverse edge portion 160, a second transverse edge portion 162, and a middle portion 164. The middle portion 164 extends between the first transverse edge portion 160 and the second transverse edge portion 162 and is substantially planar. The first transverse edge portion 160 and the second transverse edge portion 162 extend at angles relative to the cutting plane 138. Each of the first transverse edge portion 160 and the second transverse edge portion 162 includes teeth 166. In other embodiments, the movable blade 116 may have different configurations and be within the scope of the present invention.

The movable blade 116 has a thickness defined between opposite surfaces of the movable blade. The thickness may be in a range from about 0.05 mm to about 0.60 mm. The thickness may vary throughout the movable blade 116. For example, the movable blade 116 may have a maximum thickness in the middle portion 164 and minimum thicknesses in the teeth 166. In other embodiments, the movable blade 116 may have a different thickness and be within the scope of the invention.

With reference now to FIGS. 4 and 11-13, the guard 110 is generally V-shaped in cross-section to generally define an interior space in which the blade assembly 108 is disposed upon assembly of the head 104. The guard generally includes a middle portion 168 and transverse comb portions 170 disposed on opposite sides of the middle portion and corresponding generally to the first and second transverse edge portions 118, 120 of the stationary blade 114. The comb portions 170 each include a respective set of comb teeth 172 corresponding to and in proximity of the corresponding teeth 124 of the stationary blade 114 and associated teeth 166 of the movable blade 116. In other embodiments, the guard 110 may have other suitable configurations without departing from the scope of the invention.

Figure 13:
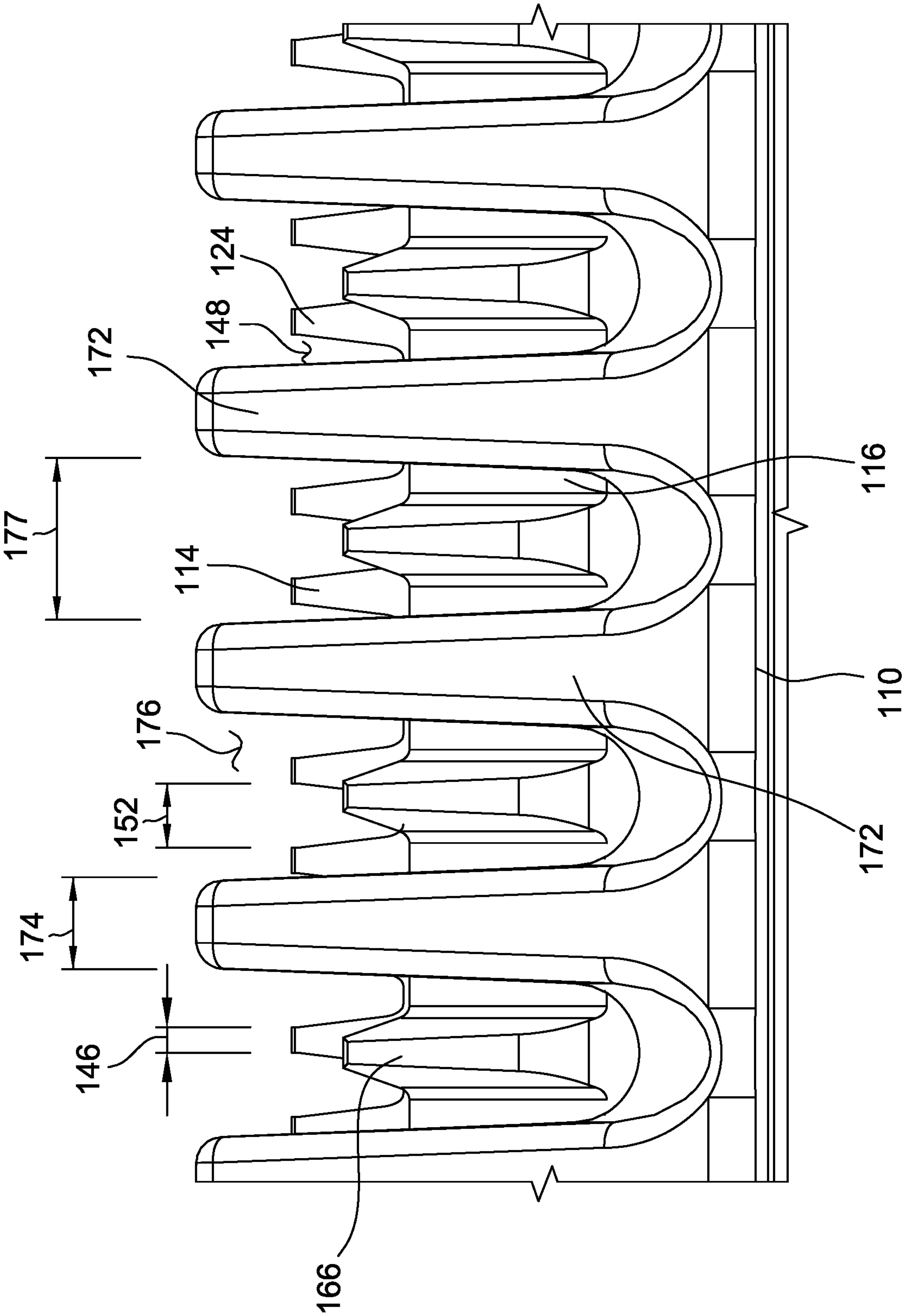
FIG. 13 is an enlarged bottom view of a portion of the head of FIG. 5.
Figure 14:
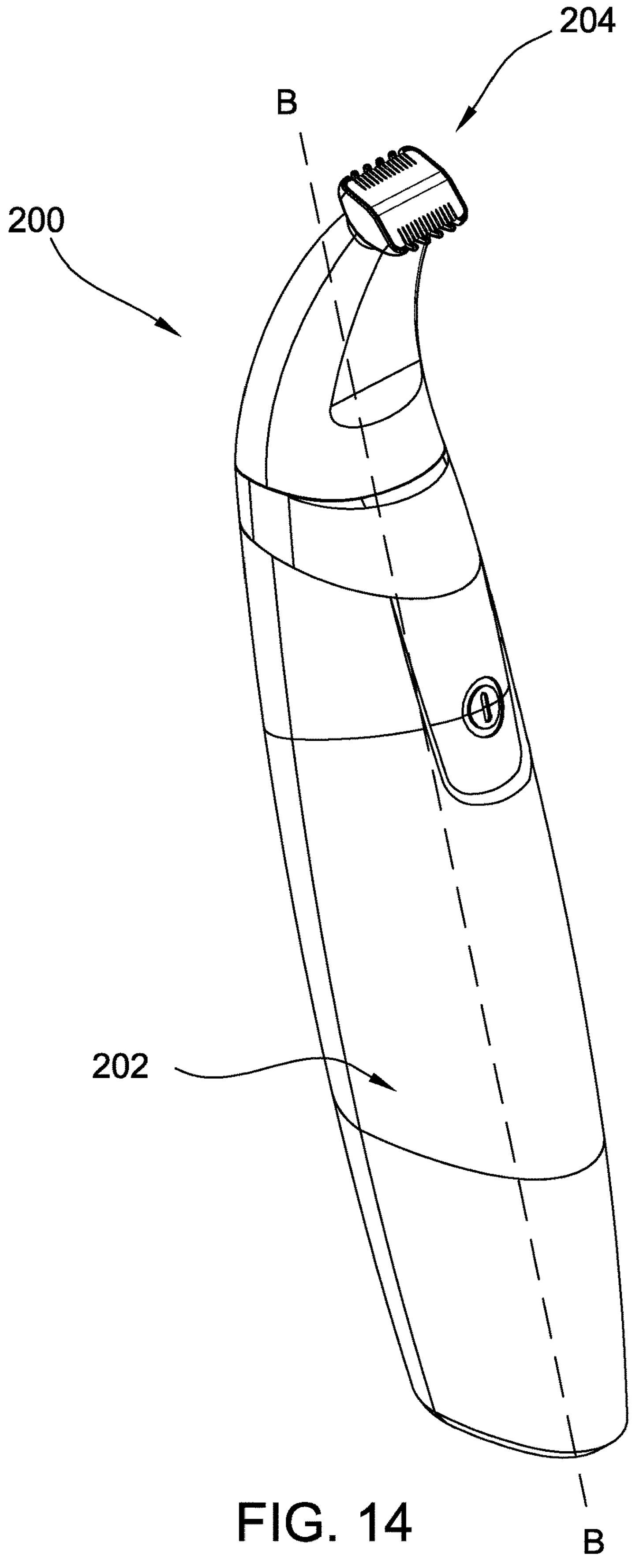
FIG. 14 is a perspective view of a second embodiment of a hair grooming appliance.

As shown in FIG. 13, each comb tooth 172 of the guard 110 has a width 174 that is greater than width 146 of the stationary blade teeth 124 as well as the width of the movable blade teeth 166. In some suitable embodiments, the width 174 is in the range of about 0.2 mm to about 1.2 mm, and more preferably in the range of about 0.5 mm to about 0.8 mm. The comb teeth 172 of the guard 110 are spaced equidistant from each other by suitable gaps 176. In some embodiments, the gaps 176 have a width 177 in the range of about 1 mm to about 2 mm, more preferably in the range of about 1.25 mm to about 1.75 mm. In the illustrated embodiment, the guard 110 is configured such that the comb teeth 172 of the guard align with approximately every other tooth 166 of the movable blade 116. The relatively larger spacing of the comb teeth 172 of the guard 110 allows the stationary blade 114 and the movable blade 116 to cut a greater range of hair lengths. In particular, the comb teeth 172 arrangement enables long hairs to enter between the teeth 172 and be cut by the blade assembly 108.

Figure 12:
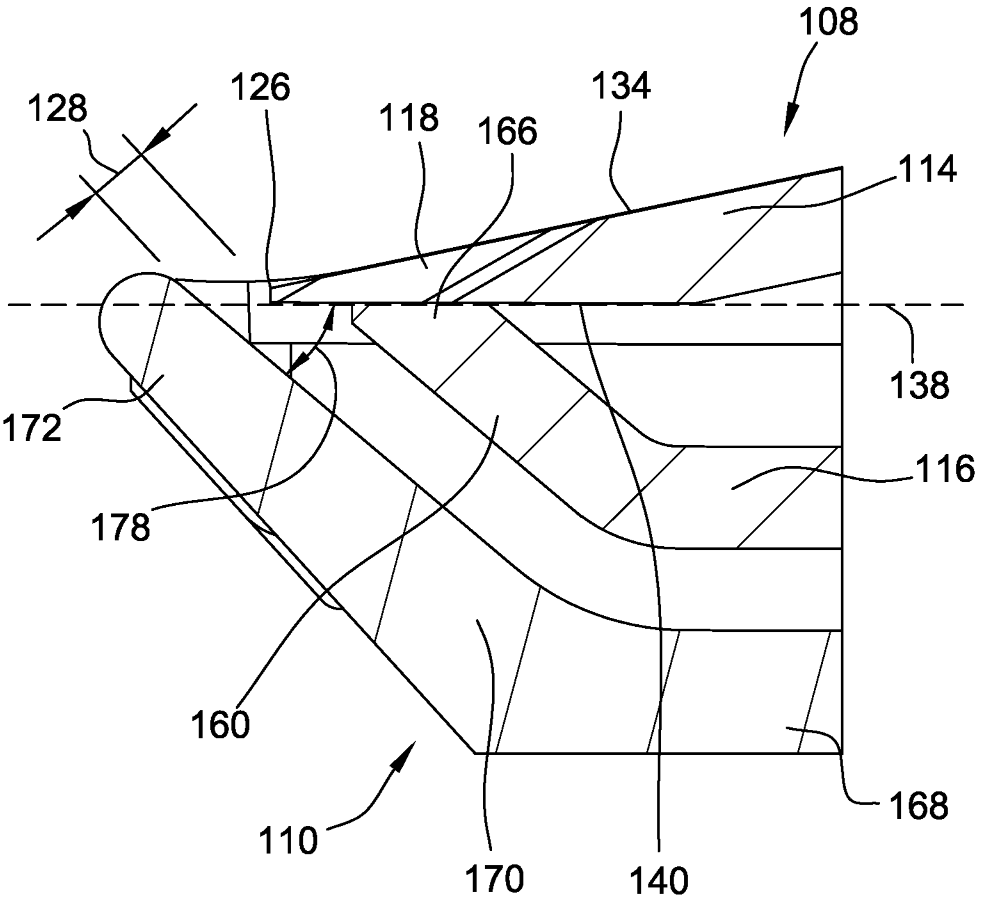
FIG. 12 is an enlarged cross-section of a portion of the head shown in FIG. 5, including the blade assembly of FIG. 6 and the guard of FIG. 11.

With particular reference to FIG. 12, because the guard 110 is generally V-shaped in cross-section, the comb portions 170 of the guard extend upward and outward past the edges 126, 130 of the stationary blade at an angle 178 relative to the cutting plane 138 of the blade assembly 108. In some embodiments, the angle 178 of the comb portions 170 of the guard 110 is in the range of about 5° to about 85°, and more suitably in the range of about 20° to about 45°. In the illustrated embodiment, the angle 178 is approximately 30°.

Additionally, because the comb portions 170 of the guard 110 are angled in this manner, the comb portions are spaced from the respective edges 126, 130 of the stationary blade 114, e.g., to define respective spaces 128 extending perpendicular to the comb portions and extending from the comb portions to the respective edge 126, 130 of the stationary blade. In some embodiments, the spaces 128 have a width in the range of about 0.1 mm to about 0.5 mm. In this manner, the guard 110 is configured to increase the comfort of the person whose hair is being trimmed. For example, the disclosed guard 110 configuration reduces pinching of the user's skin during trimming, e.g., while moving the trimmer over the user's face during trimming. The guard 110 configuration also reduces irritation of the skin that would otherwise be caused by the blades 114, 116 directly contacting the skin. It is understood, however, that in other embodiments the guard 110 may be configured other than as illustrated and described herein and remain within some aspects of the present invention.

The guard 110 extends at least to the cutting plane 138. Specifically, in the illustrated embodiment, the comb portions 170 of the guard 110 extend from the middle portion 168 of the guard 110 proximate the base of the stationary blade 114 to beyond the cutting plane 138. At least some of the comb teeth 171 extend beyond the cutting plane 138 to accommodate flexing of the blades 114, 116 such as in the middle of the blades. Comb teeth 171 located proximate the ends of the blades 114, 116 may extend to and end at the cutting plane 138. In other embodiments, the comb portions 170 of the guard 110 may extend any distance that enables the guard 110 to function as described.

The guard 110 has a thickness defined between opposite sides of the comb teeth 172 at the cutting plane 138 in a direction parallel to the cutting plane. For example, the thickness of the guard may be in a range of about 0.05 mm to about 6 mm. As a result, the guard 110 inhibits skin being pinched between or contacting the blades 114, 116 at the cutting plane 138 and allows hair to be cut by the blades 114, 116.

In some embodiments, at least some of the comb teeth 171 have a thickness and/or height that is different from the thickness and/or height of other comb teeth. For example, in some embodiments, the comb teeth 171 extending proximate the ends of the blades 114, 116 are thinner and shorter than the comb teeth 171 extending proximate the middle of the blades 114, 116. Accordingly, the larger comb teeth 171 may accommodate any flexing of the middle of the blades 114, 116 during operation. Also, the increased size of the comb teeth 171 provides increased comfort and further reduces the risk skin being pinched between or contacting the blades 114, 116 at the cutting plane 138. In addition, the varying thickness and height of the comb teeth 171 is configured to maintain a reduced visual profile of the guard 110. In some embodiments, the guard 110 may include at least one comb tooth 171 that has a thickness of at least about 0.5 mm or at least about 1.5 mm or at least about 5 mm. In some embodiments, the guard 110 may include at least one comb tooth 171 that has a thickness of no more than about 0.1 mm. In other embodiments, the comb teeth 171 may have any thickness that enables the guard 110 to function as described herein.

Referring now to FIGS. 14-20, a second embodiment of an electric hair grooming appliance is generally indicated at 200 (FIG. 14), also in the form of trimmer. More specifically, the illustrated trimmer 200 is similar to the trimmer 100 of the embodiment of FIGS. 1-13 in that it includes a handle, indicated generally at 202, and a head (broadly, a hair grooming assembly), indicated generally at 204 mounted on the handle. Together the handle 202 and the head 204 generally define a longitudinal axis B-B of the trimmer 200. In this embodiment, the head 204 is fixed, e.g., not pivotable, relative to the handle 202. The head 204 is suitably detachable from the handle 202 for cleaning and/or replacement. However, it is understood that in other embodiments the head 104 may be affixed to handle 102.

Figure 15:
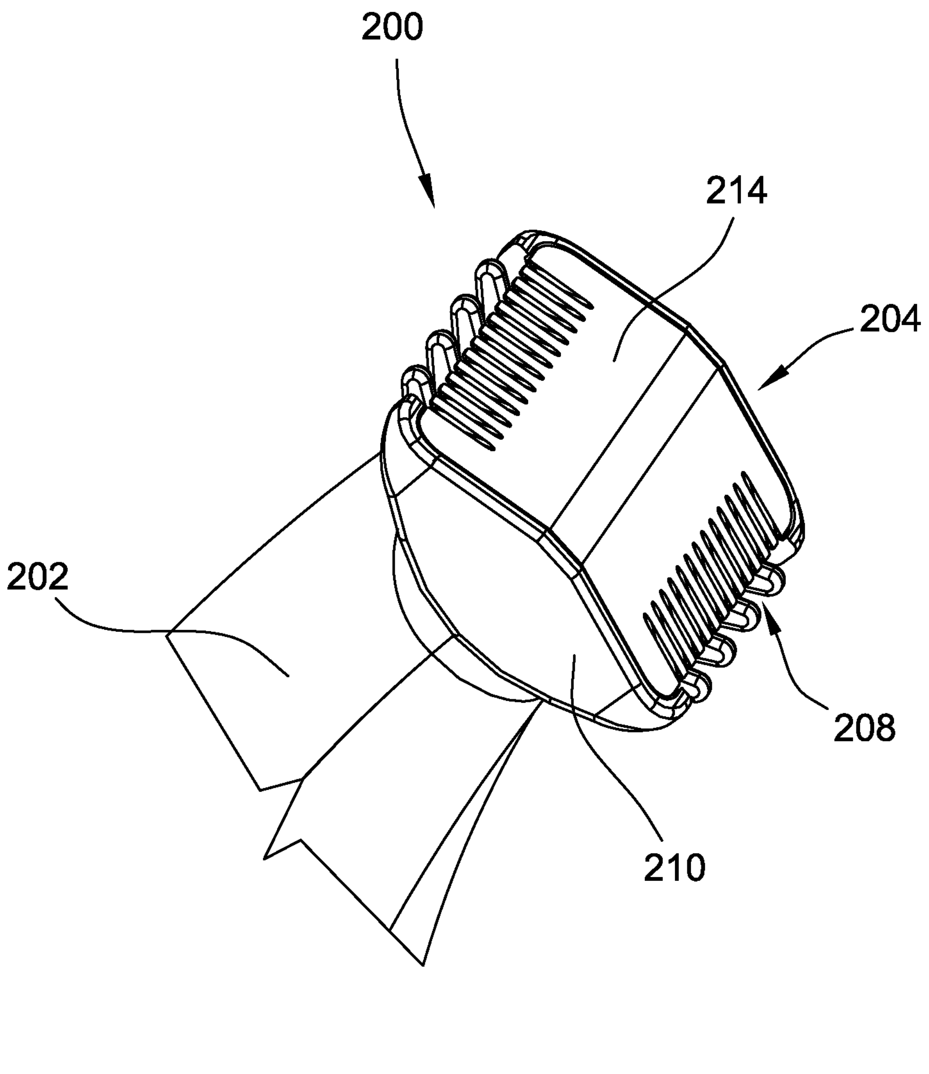
FIG. 15 is an enlarged perspective view of a portion of the hair grooming appliance shown in FIG. 14.
Figure 16:
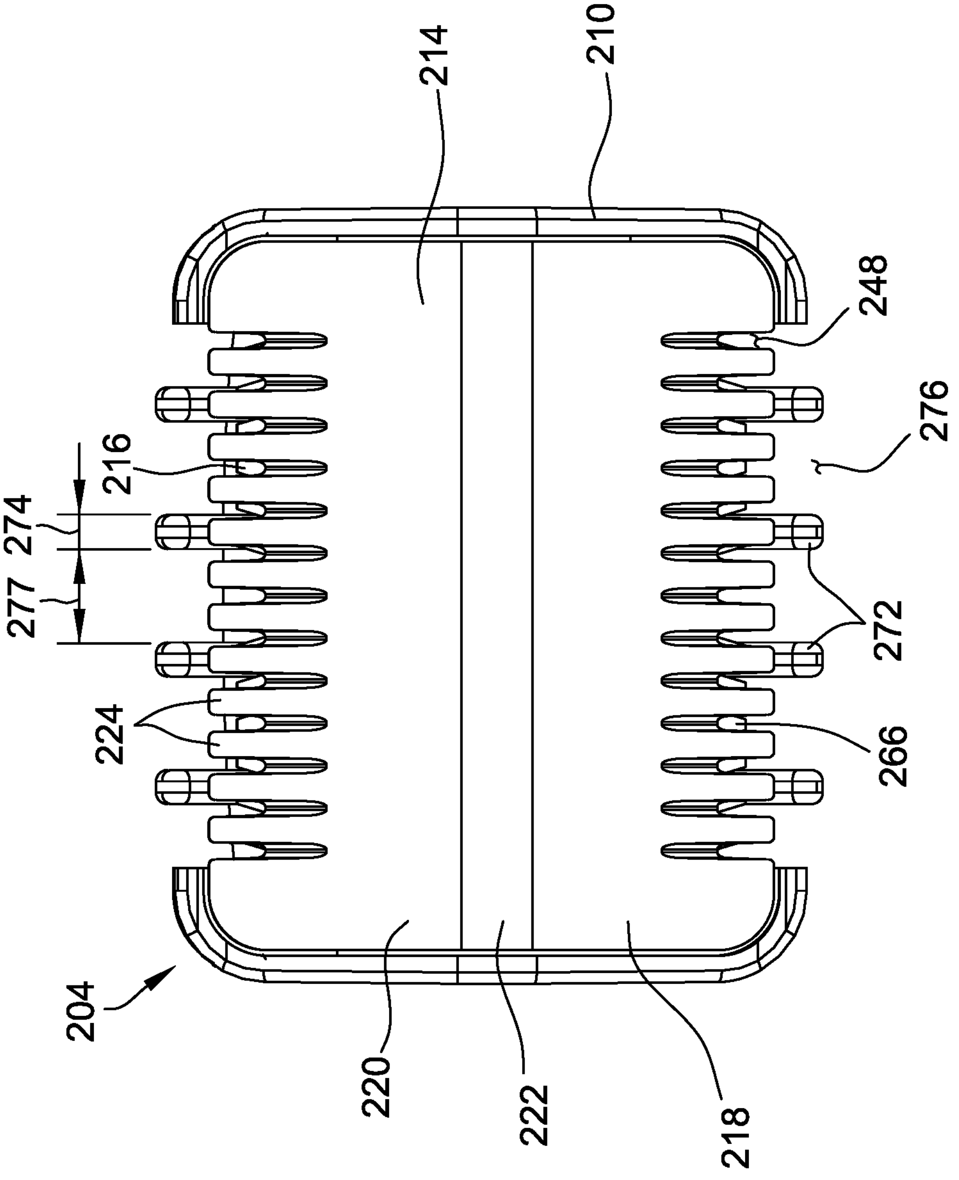
FIG. 16 is a top plan view of a head of the hair grooming appliance shown in FIG. 14.
Figure 17:
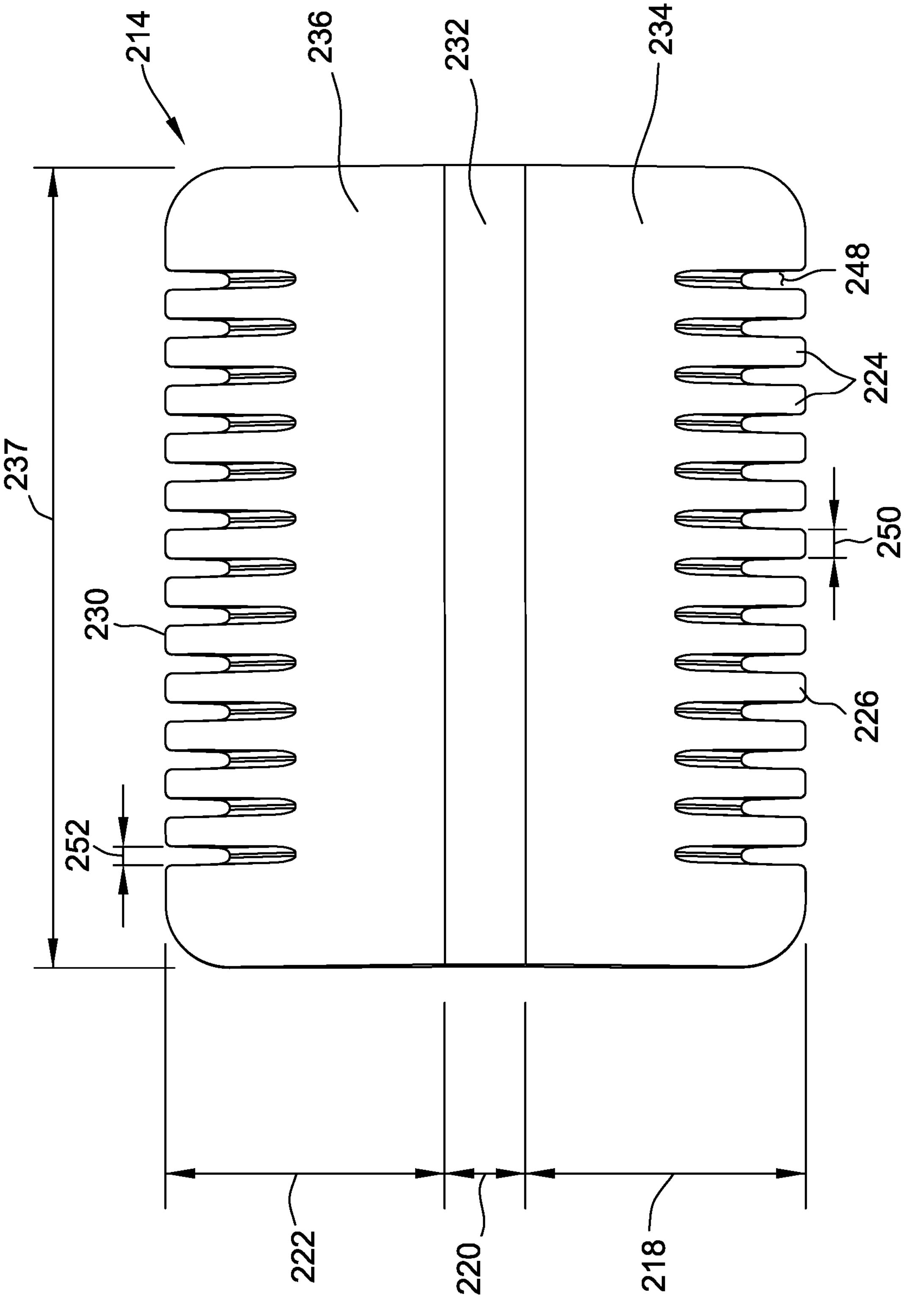
FIG. 17 is a top plan view of a stationary blade of the hair grooming appliance shown in FIG. 14.

Referring to FIGS. 15-17, the head 204 includes a blade assembly 208 and a guard 210 configured to receive the blade assembly therein. The blade assembly 208 generally comprises a stationary blade 214 and a movable blade 216. The stationary blade 214 includes a first transverse edge portion 218, a second transverse edge portion 220, and a middle portion 222 extending therebetween and including a generally planar upper surface 232. The first transverse edge portion 218 includes blade teeth 224 defining a first edge 226 of the stationary blade 214. The second transverse edge portion 220 includes blade teeth 224 forming a second edge 230 of the stationary blade 214. The first transverse edge portion 218 includes a first upper surface 234 extending from the first edge 226 to the upper surface 232, while the second transverse edge portion 220 includes a second upper surface 236 extending from the second edge 230 to the upper surface 232. The first upper surface 234 and the second upper surface 236 extend continuously at a constant slope from the respective edges 226, 230 to the upper surface 232 so that the stationary blade is beveled on both transverse sides of the middle portion 222. The stationary blade 214 of this embodiment suitably has a length 237 of approximately 12 mm. In other embodiments, however, the length of the stationary blade 214 may be greater or less than 12 mm and remain within the scope of this invention.

Figure 18:
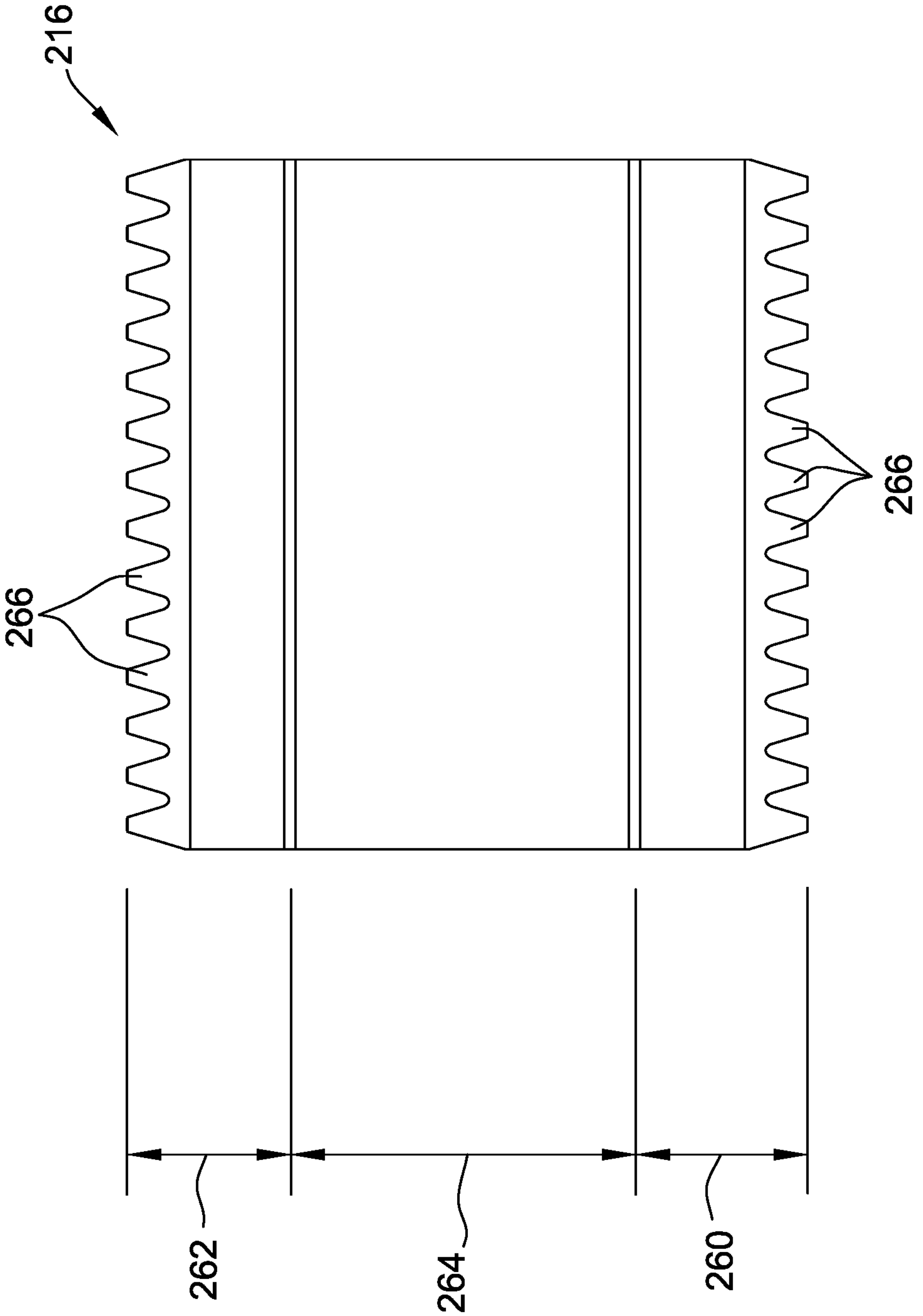
FIG. 18 is a top plan view of a movable blade of the hair grooming appliance shown in FIG. 14.

As seen in FIG. 18, the movable blade 216 includes a first transverse edge portion 260, a second transverse edge portion 262, and a middle portion 264 extending therebetween. The middle portion 264 extends between the first transverse edge portion 260 and the second transverse edge portion 262 and is substantially planar. In addition, the middle portion 264 is substantially parallel to the cutting plane 238 defined by the interface between the stationary blade 214 and the movable blade 216. The first transverse edge portion 260 and the second transverse edge portion 262 are angled relative to the cutting plane 238. Each of the first transverse edge portion 260 and the second transverse edge portion 262 includes a set of blade teeth 266. In other embodiments, the movable blade 216 may have different configurations without departing from some aspects of the invention.

Figure 19:
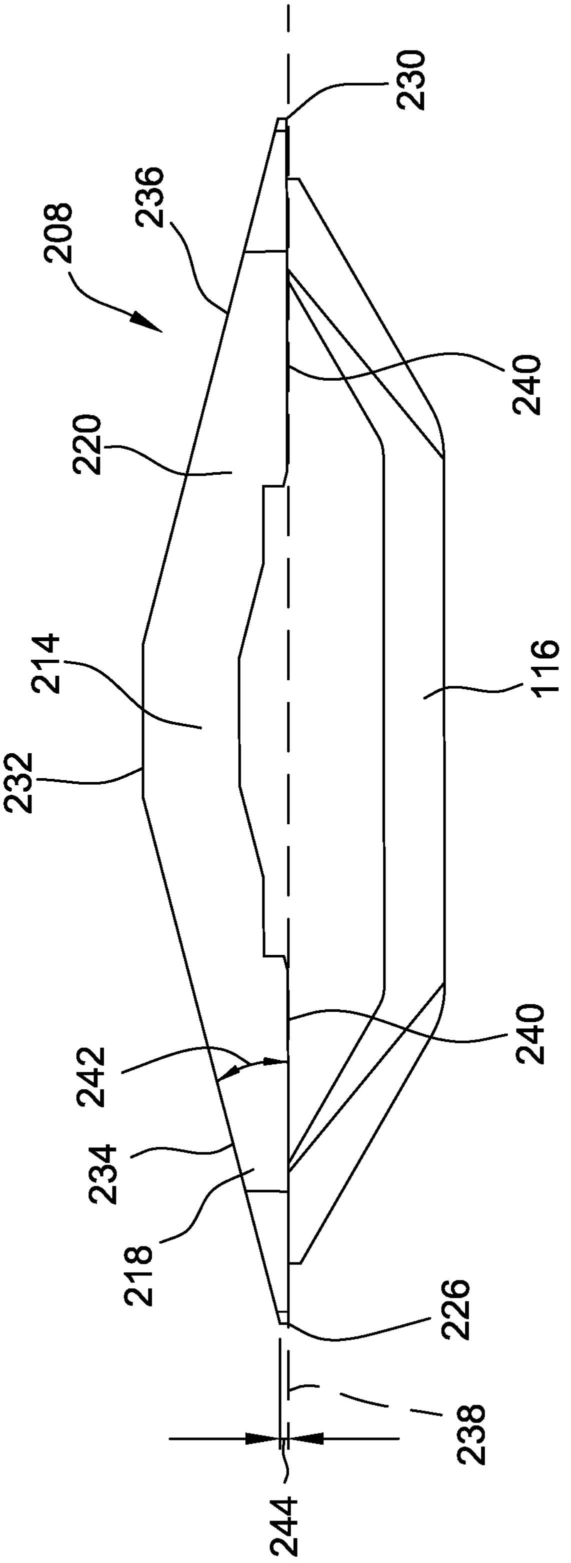
FIG. 19 is a side elevation of the stationary blade and the movable blade of the hair grooming appliance shown in FIG. 14.

Referring now to FIG. 19, the movable blade 216 is configured to contact lower surfaces 240 of the first and second transverse edge portions 218, 220 of the stationary blade 214 as the movable blade reciprocates. The upper surface 232 of the middle portion of the stationary blade 214 is substantially parallel to the cutting plane 238. In contrast, the first upper surface 234 and the second upper surface 236 of the stationary are angled relative to the cutting plane 238 and hence the upper surface 232 of the middle portion 222. The lower surfaces 240 of the stationary blade are opposite the respective first and second upper surfaces 234, 236 of the stationary blade. The lower surfaces 240 are substantially planar and parallel to the upper surface 232 and the cutting plane 238.

In the illustrated embodiment, the stationary blade 214 is symmetric about a midline of the middle portion 222. Accordingly, the second transverse edge portion 220 has dimensions that are substantially equal to the first transverse edge portion 218. Therefore, the description, including dimensions, of the first transverse edge portion 218 may also apply to the second transverse edge portion 220, and vice versa. In other embodiments, the second transverse edge portion 220 and the first transverse edge portion 218 may have some dimensions that differ. The first upper surface 234 defines an angle 242 with the cutting plane 238 in the range of about 5° to about 25°, and more preferably in the range of about 10° to about 20°. In the illustrated embodiment, the angle 242 is approximately 15°.

The first transverse edge portion 218 extends away from the lower surface 240 at a constant angle from the first edge 226 to the middle portion 222. Accordingly, the first transverse edge portion 218 has a varying thickness 244 between the first upper surface 234 and the lower surface 240. The first transverse edge portion 218 has a minimum thickness 244 at the first edge 226 in the range of about 0.02 millimeters (mm) to about 0.07 mm. In the illustrated embodiment, the thickness 244 at the first edge 226 is approximately 0.06 mm.

Referring back to FIG. 17, each of the first and second transverse edge portions 218, 220 includes respective blade teeth 224 at least partially forming the edges 226, 230. Each tooth has a width 250 at the respective edge 226, 230 in the range of about 0.2 mm to about 1 mm, and more preferably in the range of about 0.3 mm to about 0.6 mm. In the illustrated embodiment, the width 250 of each blade tooth 224 is approximately 0.5 mm. The teeth 124 are spaced by suitable gaps 248 having a width 252 at the respective edge 226, 230 in the range of about 0.1 mm to about 0.5 mm. In the illustrated embodiment, the width 252 is approximately 0.3 mm.

Figure 20:
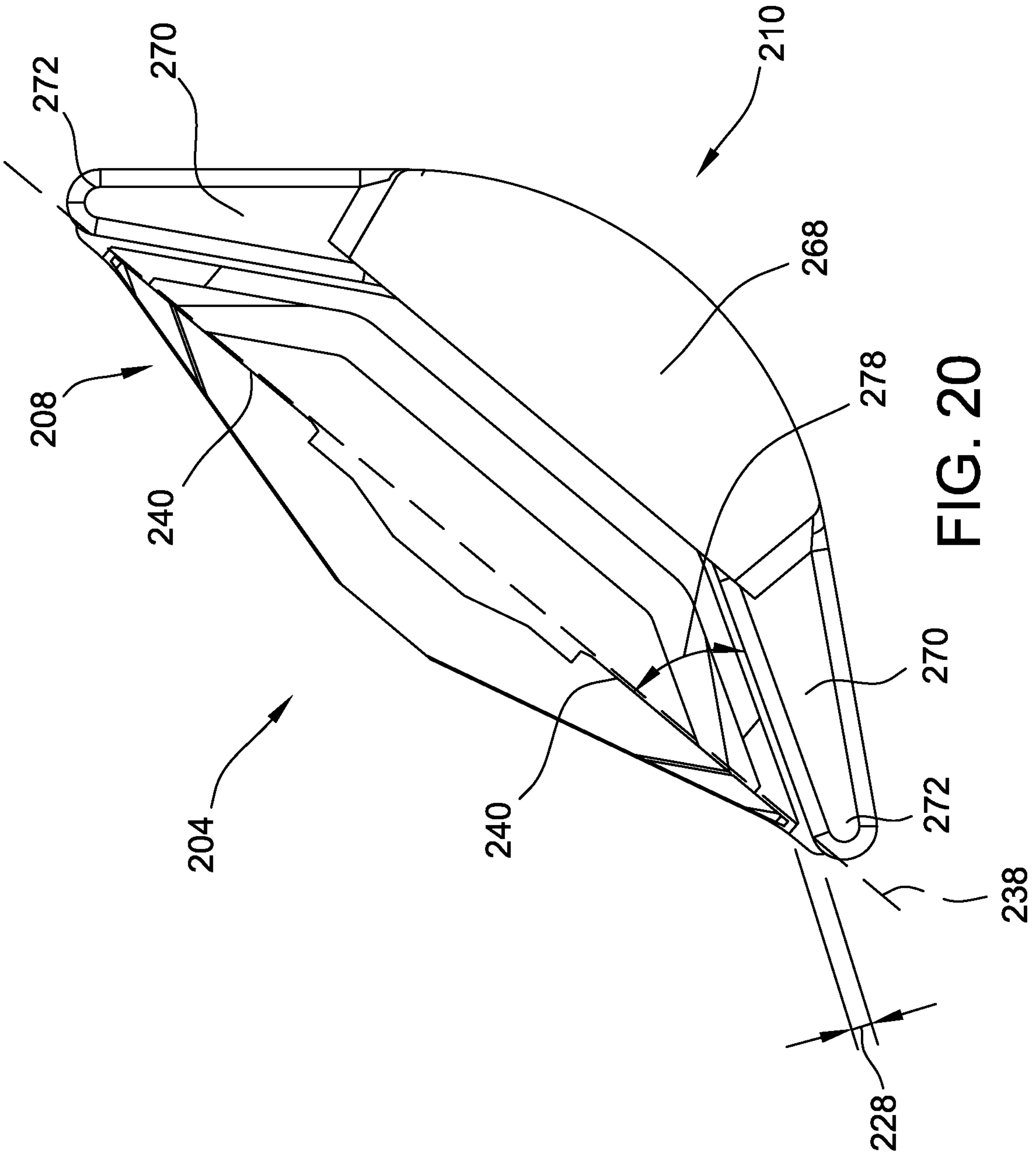
FIG. 20 is a cross-section of the head of the hair grooming appliance shown in FIG. 14.

With reference to FIG. 20, the guard 210 is generally V-shaped in cross-section and includes a middle portion 268 and opposed comb portions 270 extending outward and upward from the middle portion to form an interior space for receiving the blade assembly 208 into the guard. The guard 210 is configured to receive the blade assembly 208 such that the comb portions 270 extend in proximity to but otherwise outward of the edges 226, 230 of the stationary blade 214. In particular, the comb portions 270 include comb teeth 272 that extend adjacent the stationary blade teeth 224 and the movable blade teeth 266. In other embodiments, the guard 210 may have other configurations without departing from some aspects of the invention.

As shown in FIG. 16, each comb tooth 272 has a width 274 that is greater than the respective widths of the stationary blade teeth 224 and the movable blade teeth 266. In some embodiments, the width 274 of each comb tooth is in the range of about 0.5 mm to about 1 mm, more preferably in the range of about 0.6 mm to about 0.8 mm. The comb teeth are suitably spaced from each by gaps 276 each having a gap width 277 in the range of about 1 mm to about 2 mm, and more preferably in the range of about 1.5 mm to about 1.8 mm. In the illustrated embodiment, the comb teeth 272 and gap width 277 is such that two stationary blade teeth 224 are capable of positioning between each adjacent pair of comb teeth 272.

With reference to FIG. 20, the comb portion 270 extends past the blade assembly 208 at an angle 278 relative to the cutting plane 238. In some embodiments, the angle 278 is in the range of about 5° to about 85°, and more preferably in the range of about 20° to about 45°. The comb portions 270 are spaced from the respective edges 226, 230 of the stationary blade 214 to define spaces 228 therebetween on opposite sides of the stationary blade 214—as determined perpendicular to the comb portion and extending from the comb portion to the respective edge of the stationary blade. In some embodiments, each space 228 has a width in the range of about 0.1 mm to about 0.5 mm.

Figure 21:
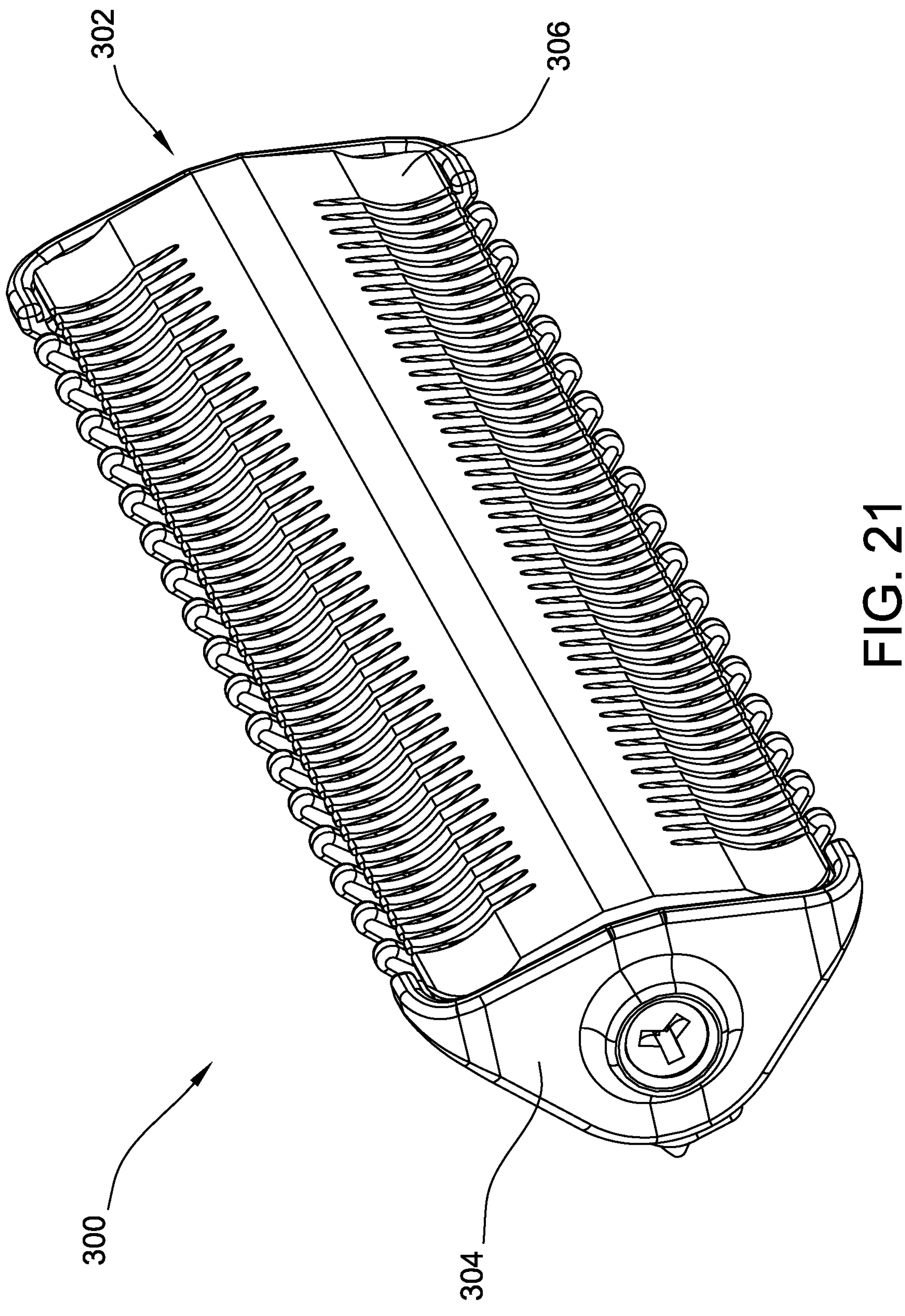
FIG. 21 is a perspective view of an embodiment of a head for use with the hair grooming appliances shown in FIGS. 1 and 14.
Figure 22:
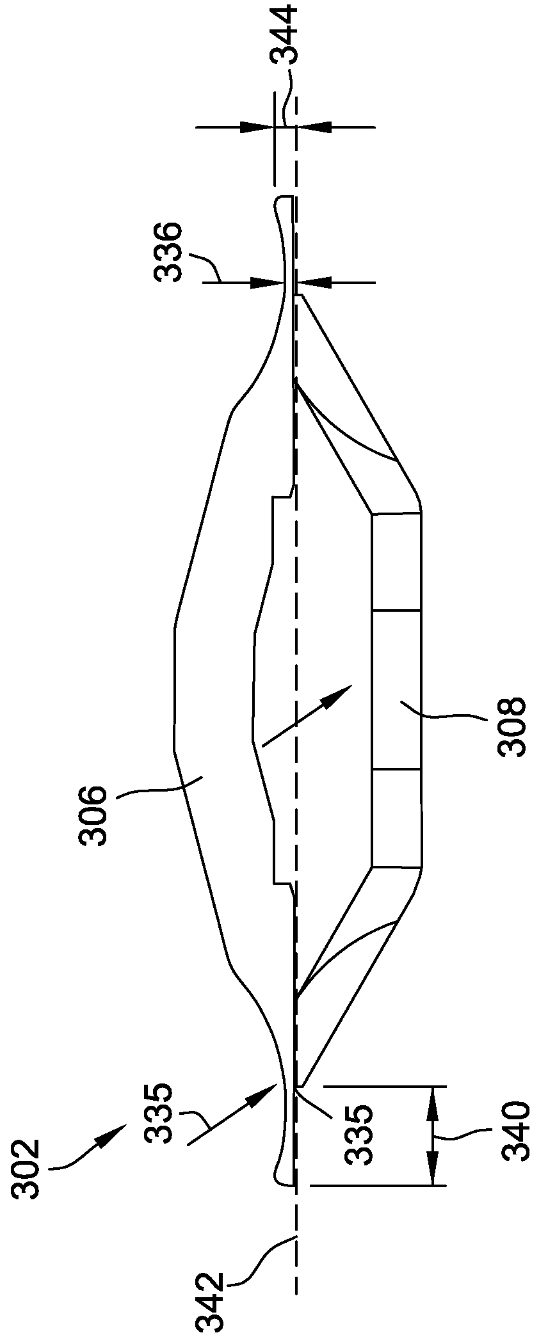
FIG. 22 is a side elevation of a blade assembly of the head shown in FIG. 21.
Figure 23:
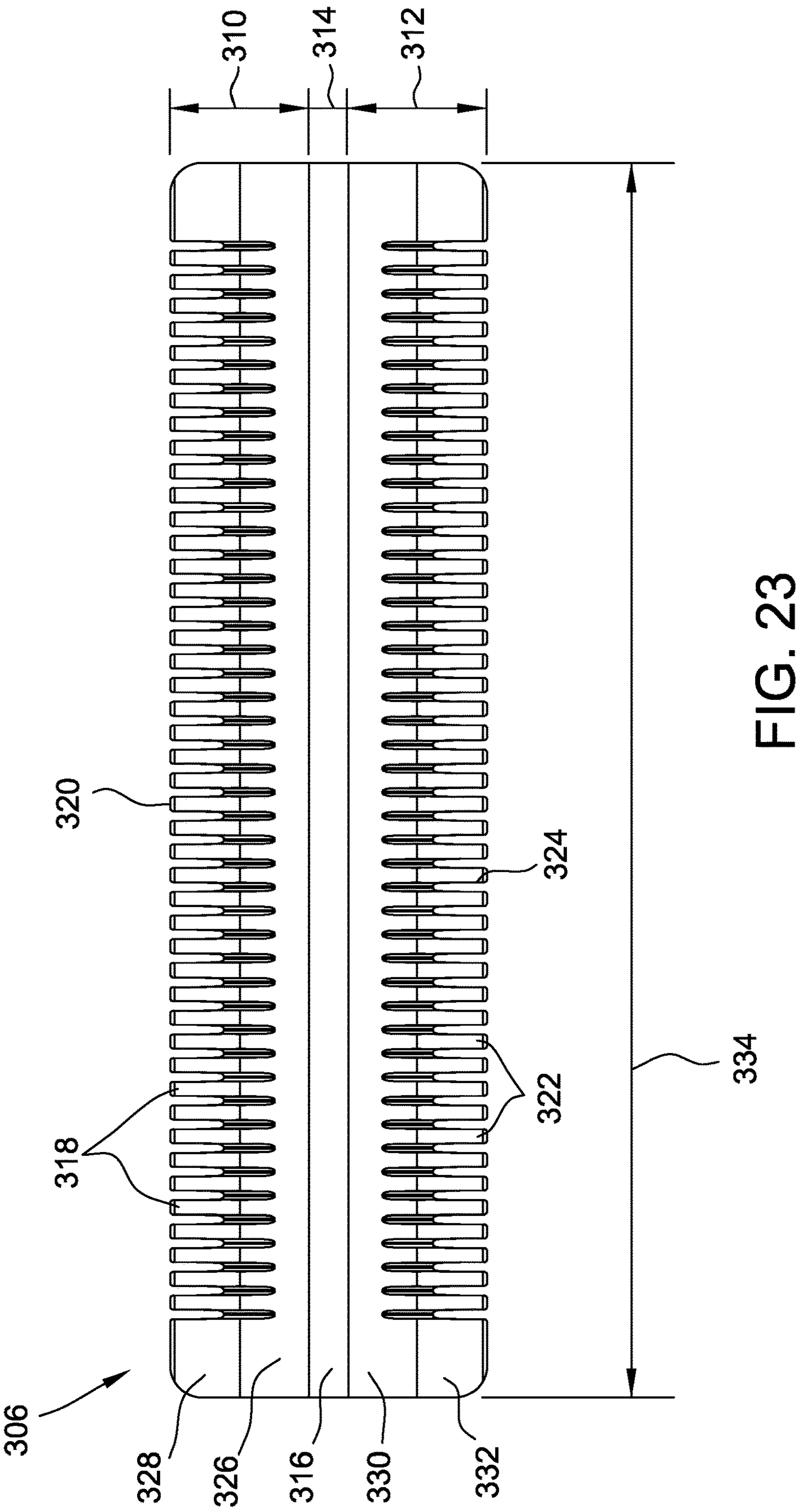
FIG. 23 is a top plan view of a stationary blade of the blade assembly shown in FIG. 22.

Referring now to FIGS. 21-23, an embodiment of a head for use with hair grooming appliance 100 (shown in FIG. 1) and hair grooming appliance 200 (shown in FIG. 2) is generally indicated at 300 (FIG. 21). The head 300 includes a blade assembly 302 and a guard 304 configured to receive the blade assembly therein. The blade assembly 302 generally comprises a stationary blade 306 and a movable blade 308 (FIG. 22). The head 300 may have other configurations without departing from some aspects of this invention.

The stationary blade 306 has a varying thickness and is configured to allow the blade assembly 302 to cut hairs close to a user's skin. In addition, the stationary blade 306 is configured to reduce irritation to the skin during operation. For example, the thick portions of the stationary blade 306 prevent flexing of the stationary blade 306 during operation. The thin portions of the stationary blade 306 facilitate the blade assembly 302 cutting hairs close to the skin.

With reference to FIG. 23, the stationary blade 306 includes a first transverse edge portion 310, a second transverse edge portion 312, and a middle portion 314 extending therebetween and including a generally planar upper surface 316. The first transverse edge portion 310 includes blade teeth 318 forming a first edge 320 of the stationary blade 306. The second transverse edge portion 312 includes blade teeth 322 forming a second edge 324 of the stationary blade 306. The stationary blade 306 of this embodiment suitably has a transversely extending length 334 of approximately 39 mm. In other embodiments, however, the length of the stationary blade 306 may be greater or less than 39 mm and remain within the scope of this invention.

The first transverse edge portion 310 includes a first upper surface 326 and a first curved upper surface 328. The first upper surface 326 extends from the planar upper surface 316 to the first curved upper surface 328. The first curved upper surface 328 extends from the first upper surface 326 to the first edge 320.

The second transverse edge portion 312 includes a second upper surface 330 and a second curved upper surface 332. The second upper surface 330 extends from the upper surface 316 to the second curved upper surface 332. The second curved upper surface 332 extends from the second upper surface 330 to the second edge 324.

As shown in FIG. 22, the first curved upper surface 328 and the second curved upper surface 332 are concave and curve towards planar lower surfaces 337 of the stationary blade 306. Accordingly, the stationary blade 306 has a reduced thickness along the first curved upper surface 328 and the second curved upper surface 332. In particular, the stationary blade 306 has a minimum thickness 336 defined between each curved upper surface 328, 332 and the respective planar lower surface 337 of the stationary blade 306. The planar lower surfaces 337 are configured to contact the movable blade 308. In some embodiments, the minimum thickness 336 is in a range of about 0.05 mm to about 0.1 mm. In this embodiment, the minimum thickness 336 is approximately 0.08 mm.

The first curved upper surface 328 and the second curved upper surface 332 each have a radius 338. Each radius 338 may be any suitable radius that enables the stationary blade to function as described herein.

The first edge 320 and the second edge 324 of the stationary blade 306 are located a distance 340 from edges 335 of the movable blade 308. The distance 340 is measured along a cutting plane 342 of the blade assembly 302. The distance 340 prevents the movable blade 308 contacting the user's skin during operation. In some embodiments, the distance 340 is in a range of about 0.5 mm to about 2 mm. In this embodiment, the distance 340 is approximately 1 mm.

The stationary blade 306 has a tip thickness 344 at the first edge 320 and the second edge 324. The concave curves of the first curved upper surface 328 and the second curved upper surface 332 allow the tip thickness 344 to be greater than the minimum thickness 336. The tip thickness 344 allows for laser ball tips to be incorporated into stationary blade 306. In some embodiments, the tip thickness 344 is in a range of about 0.1 mm to about 0.5 mm. In this embodiment, the tip thickness 344 is approximately 0.16 mm without laser ball tips and approximately 0.24 mm including laser ball tips. In other embodiments, the stationary blade 306 may have other tips without departing from some aspects of this invention.

In some embodiments, a trimmer includes a handle, a drive assembly in the handle, and a head attached to the handle. The head includes a stationary blade including a first transverse edge portion, a second transverse edge portion, and a middle portion connecting the first transverse edge portion and the second transverse edge portion. The first transverse edge portion includes blade teeth defining a first edge of the blade. The second transverse edge portion includes blade teeth defining a second edge of the blade. The first transverse edge portion further includes a first upper surface extending from the first edge to the middle portion and the second transverse edge portion further includes a second upper surface extending from the second edge to the upper surface of the middle portion. The first upper surface includes at least one of an angled surface, a concave surface, and a convex surface along at least a portion of the extension of the first upper surface between the middle portion and the first edge. The head also includes a movable blade in shearing contact with the first transverse edge portion and the second transverse edge portion of the stationary blade. The drive assembly is configured to reciprocate the movable blade relative to the stationary blade.

In one such embodiment, the second upper surface includes at least one of an angled surface, a concave curve, and a convex curve extending along at least a portion of the extension of the second upper surface between the middle portion and the first edge.

In another such embodiment, the middle portion includes a substantially planar upper surface extending between the first upper surface and the second upper surface.

In yet another such embodiment, the stationary blade and the movable blade are in contact with each other to define a cutting plane that is substantially planar and parallel to the upper surface of the middle portion of the stationary blade.

In another such embodiment, the first upper surface is angled relative to the cutting plane.

In yet another such embodiment, an angle between the first upper surface and the cutting plane is in the range of about 5° to about 25°.

In another such embodiment, the angle between the first upper surface and the cutting plane is in the range of about 10° to about 20°.

In yet another such embodiment, the stationary blade has a thickness at the first edge in a range of about 0.02 millimeters (mm) to about 0.07 mm.

In yet another such embodiment, the thickness of the stationary blade at the first edge is approximately 0.06 mm.

In yet another such embodiment, the first upper surface includes a curve extending along a portion of the extension of the first upper surface between the middle portion and the first edge.

In yet another such embodiment, the second upper surface includes a curve extending along a portion of the extension of the second upper surface between the middle portion and the second edge.

In yet another such embodiment, the stationary blade has a minimum thickness defined by the first upper surface in a range of about 0.05 mm to about 0.1 mm.

In yet another such embodiment, the stationary blade has a tip thickness in a range of about 0.1 mm to about 0.5 mm.

In yet another such embodiment, the first upper surface includes a concave curve.

In other embodiments, a trimmer includes a handle, a drive assembly in the handle, and a blade assembly configured for operative connection to the drive assembly. The blade assembly includes a stationary blade including blade teeth. Each blade tooth has a width. The blade assembly also includes a movable blade including blade teeth. The drive assembly is operable to reciprocate the movable blade relative to the stationary blade. The blade assembly further includes a guard disposed outward of and extending in proximity to the respective blade teeth of the stationary blade and movable blade. The guard includes comb teeth. Each comb tooth has a width that is greater than the width of each stationary blade tooth.

In one such embodiment, the stationary blade and the movable blade together define a cutting plane. The guard extends at least to the cutting plane.

In another such embodiment, the guard and the stationary blade define a gap therebetween at the cutting plane in a range of about 0.1 mm to about 0.5 mm.

In yet another such embodiment, the blade assembly is pivotably connected to the handle.

In yet another such embodiment, the width of each blade tooth of the stationary blade is in the range of about 0.2 mm to about 1 mm.

In yet another such embodiment, the blade teeth of the stationary blade are spaced by gaps having a width in the range of about 0.2 mm to about 0.5 mm.

In yet another such embodiment, the width of each comb tooth is in the range of about 0.5 mm to about 1.2 mm.

In yet another such embodiment, the comb teeth of the guard are spaced by gaps. Each gap has a width in the range of about 1 mm to about 2 mm.

In other embodiments, a hair grooming appliance includes a handle, a drive assembly in the handle, and a head attached to the handle. The head includes a blade assembly including a stationary blade and a movable blade. The drive assembly is operable to reciprocate the movable blade relative to the stationary blade. Each of the stationary blade and the movable blade includes respective blade teeth. The blade teeth of the stationary blade teeth define a first blade edge and a second blade edge of the stationary blade. The stationary blade includes a first transverse edge portion, a second transverse edge portion, and a middle portion extending therebetween. The first transverse edge portion has a first upper surface extending from the first edge of the stationary blade to the middle portion. The second transverse edge portion includes a second upper surface extending from the second edge of the stationary blade to the middle portion. The first upper surface includes at least one of an angled surface, a concave surface, and a convex surface along at least a portion of the extension of the first upper surface between the middle portion and the first edge. The second upper surface includes at least one of an angled surface, a concave surface, and a convex surface along at least a portion of the extension of the second upper surface between the middle portion and the second edge. The head also includes a guard configured to receive the blade assembly therein and having opposed comb portions disposed in proximity to the first and second edges of the stationary blade. Each of the comb portions has comb teeth.

In one such embodiment, the stationary blade and the movable blade define a cutting plane therebetween. An angle between the first upper surface and the cutting plane is in the range of about 5° to about 25°.

In another such embodiment, the blade teeth of the stationary blade each have a width. Each comb tooth has a width that is greater than the width of each blade tooth of the stationary blade.

In yet another such embodiment, the comb portions of the guard are spaced from the first and second edges of the stationary blade in the range of about 0.1 mm to about 0.5 mm as determined perpendicular to the respective comb portion.

In yet another such embodiment, the head is pivotably attached to the handle.

As described above, embodiments of a trimmer include a blade that includes at least one beveled edge. In some embodiments, the blade is a double-edged blade and includes two beveled edges. The beveled edges allow the blade to be sharper than conventional blades while also being more durable than at least some known blades. Accordingly, the blade may have a longer service life. Moreover, in some embodiments, the trimmer may cost less to assemble than at least some known trimmers.

In addition, embodiments of the trimmer include a blade including a curved or recessed surface along the beveled edge. The curved surface allows the blade to be thinner adjacent cutting edges of a movable blade to provide a closer trim. In addition, the blade includes relatively thick portions that resist flexing of the blade. Moreover, in some embodiments, the curved surface is concave and allows the blade to have thicker tips.

In addition, embodiments of the trimmer include a guard having comb teeth in spaced proximity to the blade assembly. The guard protects the skin of a person as the trimmer is moved along the skin. In addition, the guard allows the blade assembly to cut a greater range of hairs.

Exemplary embodiments of an apparatus, system, and methods for a hair grooming appliance are described above in detail. The apparatus, system, and methods described herein are not limited to the specific embodiments described, but rather, components of apparatus, systems, and/or steps of the methods may be utilized independently and separately from other components and/or steps described herein. For example, the methods may also be used in combination with other hair grooming appliances, systems, and methods, and are not limited to practice with only the apparatuses, systems, and methods described herein. Rather, the exemplary embodiments can be implemented and utilized in connection with many grooming applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As various changes could be made in the above embodiments without departing from the scope of the disclosure, it is intended that all matter contained in the above description and shown in the accompanying drawings shall be interpreted as illustrative and not in a limiting sense.

What is claimed is:

1. A head for an electric handheld hair trimmer, the head comprising:

a stationary blade including:

a first transverse edge portion including blade teeth defining a first edge of the stationary blade;

a second transverse edge portion including blade teeth defining a second edge of the stationary blade; and a blade middle portion connecting the first transverse edge portion and the second transverse edge portion;

a movable blade including a first edge and an opposing second edge, the first and second edges including blade teeth in shearing contact with the respective blade teeth of the stationary blade to define a cutting plane; and a guard connected to the stationary blade, the guard is disposed outward of and extending in proximity to the respective blade teeth of the stationary blade and the movable blade, wherein the guard defines an interior space configured to receive the stationary blade and the movable blade, the guard including comb portions extending along the first and second edges of the stationary blade and a guard middle portion extending between the comb portions, wherein the comb portions and the guard middle portion define the interior space, wherein the comb portions and the guard middle portion are integrally formed as a single piece, the comb portions extending at least to the cutting plane, wherein the comb portions and the first and second edges of the stationary blade define gaps at the cutting plane in a range of 0.1 mm to 0.5 mm.

2. A head in accordance with claim 1, wherein the guard has a thickness in the range of 0.5 mm to 6 mm.

3. A head in accordance with claim 1, wherein the blade teeth of the stationary blade have a width in the range of 0.2 mm to 1 mm.

4. A head in accordance with claim 1, wherein the blade teeth of the stationary blade are spaced by gaps having a width in the range of 0.2 mm to 0.5 mm.

5. A head in accordance with claim 1, wherein the comb portion of the guard have teeth that are spaced equidistant from each other by respective gaps.

6. A head in accordance with claim 1, wherein the comb portions of the guard have some teeth have a different width or thickness than the other teeth.

7. A head in accordance with claim 1, wherein the comb portions of the guard have teeth having a width in the range of 0.2 mm to 1.2 mm.

8. A head in accordance with claim 1, wherein the comb portions of the guard have teeth that are spaced by gaps having a width in the range of 1 mm to 2 mm.

9. A head in accordance with claim 1, wherein:

the first transverse edge portion includes a first upper surface and a second upper surface, wherein the first upper surface includes at least one of an angled surface, a concave surface, and a convex surface along the extension of the first upper surface, wherein the first transverse edge portion has a minimum thickness defined along the second upper surface that is in a range of 0.05 millimeters (mm) to 0.1 mm;

the second transverse edge portion includes a third upper surface and a fourth upper surface, wherein the third upper surface includes at least one of an angled surface, a concave surface, and a convex surface along the extension of the third upper surface, wherein the first transverse edge portion has a minimum thickness at the second edge that is equal to the minimum thickness of the first transverse edge portion; and the stationary blade is symmetric about a midline of the blade middle portion, the blade middle portion having a thickness that is greater than the minimum thicknesses of the first and second transverse edge portions, the second upper surface extending from the first edge to first upper surface, the first upper surface extending from the second upper surface to the blade middle portion, the fourth upper surface extending from the second edge to the third upper surface, and the third upper surface extending from the fourth upper surface to the blade middle portion.

10. A head in accordance with claim 9, wherein the stationary blade has a length in the range of 5 mm to 50 mm.

11. A head in accordance with claim 9, wherein the movable blade has a thickness in the range of 0.05 mm to 0.60 mm.

12. A head in accordance with claim 9, wherein the movable blade and the stationary blade define a cutting plane, and wherein the blade middle portion includes an upper surface that is parallel to the cutting plane.

13. A head in accordance with claim 12, wherein the first and third upper surfaces of the first and second transverse edge portions are angled relative to the cutting plane.

14. A head in accordance with claim 13, wherein the first and third upper surfaces of the first and second transverse edge portions form an angle with the cutting plane in the range of 5° to 25°.

15. An electric handheld hair trimmer comprising:

a handle;

a drive assembly in the handle; and a head in accordance with claim 1, wherein the head is attached to the handle.

16. An electric handheld trimmer in accordance with claim 15, wherein the head is pivotable about more than one pivot axis.

17. An electric handheld hair trimmer in accordance with claim 15, wherein the head and the handle define a longitudinal axis of the electric handheld hair trimmer when the head is attached to the handle.

18. An electric handheld hair trimmer in accordance with claim 15, wherein the head is detachable from the handle such that the head may be removed, and the movable blade is operably disconnected from the drive assembly, and another head may be positioned on the handle and in operable connection with the drive assembly.

19. An electric handheld hair trimmer in accordance with claim 18, wherein the head is a first removable head, the electric handheld hair trimmer further comprising a second removable head that is attachable to the handle when the first removable head is removed.

20. An electric handheld hair trimmer in accordance with claim 19, wherein the second removable head comprises an electric shaver head or a hair clipper head.

* * * * *